US012725070B2

(12) United States Patent
O'Brien et al.

(10) Patent No.: US 12,725,070 B2
(45) Date of Patent: Sep. 1, 2026

(54) GRADIENT-BASED QUANTUM ASSISTED HAMILTONIAN LEARNING

(71) Applicant: Google LLC, Mountain View, CA (US)

(72) Inventors: Thomas Eugene O'Brien, Munich (DE); Vadim Smelyanskiy, Mountain View, CA (US); Lev Ioffe, Santa Barbara, CA (US); Yuan Su, Santa Monica, CA (US); Ryan Babbush, Venice, CA (US)

(73) Assignee: Google LLC, Mountain View, CA (US)

( * ) Notice: Subject to any disclaimer, the term of this patent is extended or adjusted under 35 U.S.C. 154(b) by 920 days.

(21) Appl. No.: 17/929,604

(22) Filed: Sep. 2, 2022

(65) Prior Publication Data

US 2023/0368064 A1 Nov. 16, 2023

Related U.S. Application Data

(60) Provisional application No. 63/240,787, filed on Sep. 3, 2021.

(51) Int. Cl.
*G06N 10/60* (2022.01)
*G06N 10/40* (2022.01)

(52) U.S. Cl.
CPC ............. *G06N 10/60* (2022.01); *G06N 10/40* (2022.01)

(58) Field of Classification Search
None
See application file for complete search history.

(56) References Cited

U.S. PATENT DOCUMENTS

2018/0232649 A1 8/2018 Wiebe et al.
2021/0182721 A1 6/2021 Li et al.
2021/0183476 A1 6/2021 Mitarai et al.

FOREIGN PATENT DOCUMENTS

WO WO 2017209791 12/2017
WO WO 2019220122 11/2019
WO WO 2019241879 12/2019

OTHER PUBLICATIONS

Wang et al., A Hybrid Quantum-Classical Hamiltonian Learning Algorithm, arXiv:2103.01061v1 [quant-ph] Mar. 1, 2021; Total pp. 24 (Year: 2021).*

(Continued)

*Primary Examiner* — Alan Chen
(74) *Attorney, Agent, or Firm* — Fish & Richardson P.C.

(57) ABSTRACT

Methods, systems, and apparatus for gradient-based quantum assisted Hamiltonian learning. In one aspect, a method includes obtaining, by a classical processor, multiple experimental data points, wherein each experimental data point is generated according to a Hamiltonian comprising parameters with unknown values; learning, by the classical processor, values of the parameters, comprising iteratively adjusting, by the classical processor and until predetermined completion criteria are met, estimated values of the parameters to minimize a cost function, wherein the cost function is dependent on the multiple experimental data points and at each iteration derivatives of the cost function with respect to respective estimated values of the parameters for the previous iteration are computed using a quantum computer.

19 Claims, 9 Drawing Sheets

(56) References Cited

OTHER PUBLICATIONS

Wang et al., Experimental Quantum Hamiltonian Learning; arXiv:1703.05402v1 [quant-ph] Mar. 15, 2017; Total pp. 6 (Year: 2017).*
Fujita et al., "Construction of Hamiltonians by supervised learning of energy and entanglement spectra." Physical Review B 97.7, Feb. 2018, 075114:1-12.
Notice of Allowance in Australian Appln. No. 2022337149, mailed on Mar. 4, 2025, 3 pages.
Notice of Allowance in Japanese Appln. No. 2024-514056, mailed on Feb. 25, 2025, 5 pages (with English translation).
Office Action in Australian Appln. No. 2022337149, mailed on Nov. 29, 2024, 3 pages.
Abanin et al., "Colloquium: Many-body localization, thermalization, and entanglement," Reviews of Modern Physics, May 2019, 91(2), 26 pages.
Ajoy et al., "Quantum simulation via filtered Hamiltonian engineering: Application to perfect quantum transport in spin networks," Physical Review Letters, May 2013:220503, 5 pages.
Álvarez et al., "Localization-delocalization transition in the dynamics of dipolar-coupled nuclear spins," Science, Aug. 2015, 349(6250): 846-848.
Andrew et al., "Nuclear Magnetic Resonance Spectra from a Crystal rotated at High Speed," Nature, Dec. 1958, 182: 1659.
Arute, "Quantum supremacy using a programmable superconducting processor," Nature, Oct. 2019, 574(7779): 505-510.
Babbush et al., "Encoding Electronic Spectra in Quantum Circuits with Linear T Complexity," Physical Review X, Oct. 2018, 8: 36 pages.
Babbush et al., "Low-Depth Quantum Simulation of Materials," Physical Review X, Mar. 2018, 8: 40 pages.
Bairey et al., "Learning a Local Hamiltonian from Local Measurements," arXiv, Jul. 2018, 8 pages.
Barskiy et al., "Zero-field nuclear magnetic resonance of chemically exchanging systems," Nature communications, Jul. 2019, 10(1), 9 pages.
Basko et al., "Metal-insulator transition in a weakly interacting many-electron system with localized single-particle states," Annals of Physics, Jan. 2006, 321(5): 1126-1205.
Bauer et al., "Area laws in a many-body localized state and its implications for topological order," arXiv, Jun. 2013, 18 pages.
Berry et al., "Efficient quantum algorithms for simulating sparse Hamiltonians," arXiv, Aug. 2005, 4 pages.
Berry et al., "Efficient Quantum Algorithms for Simulating Sparse Hamiltonians," Communications in Mathematical Physics, Mar. 2007, 270(1): 359-371.
Berry et al., "Qubitization of Arbitrary Basis Quantum Chemistry Leveraging Sparsity and Low Rank Factorization," arXiv, Nov. 2019, 44 pages.
Berry et al., "Simulating Hamiltonian Dynamics with a Truncated Taylor Series," Physical Review Letters, Mar. 2015, 119(9), 5 pages.
Bielecki et al., "Frequency-switched pulse sequences: Homonuclear decoupling and dilute spin NMR in solids," Chemical Physics Letters, Mar. 1989, 155(4-5): 341-346.
Bienias et al., "Meta Hamiltonian Learning," arXiv, Apr. 2021, 9 pages.
Boesch, "Nobel prizes for nuclear magnetic resonance: 2003 and Historical perspectives," Journal of Magnetic Resonance Imaging, Jul. 2004, 20(2): 177-179.
Bonet-Monroig et al., Nearly optimal measurement scheduling for partial tomography of quantum states, Physical Review X, Sep. 2020, 10: 12 pages.
Campbell, "Random Compiler for Fast Hamiltonian Simulation," arXiv, Jun. 2019, 11 pages.
Childs et al., "Hamiltonian Simulation Using Linear Combinations of Unitary Operations," arXiv, Feb. 2012, 18 pages.
Childs et al., Nearly Optimal Lattice Simulation by Product Formulas, Physical Review Letters, Aug. 2019, 123(5), 7 pages.
Childs et al., "Quantum Algorithm for Systems of Linear Equations with Exponentially Improved Dependence on Precision," arXiv, Sep. 2017, 31 pages.
Childs et al., "Theory of Trotter Error with Commutator Scaling," Physical Review X, Feb. 2021, 11(1), 49 pages.
Childs et al., "Toward the first quantum simulation with quantum speedup," Proceedings of the National Academy of Sciences, Sep. 2018, 115(38): 9456-9461.
Colvin et al., "Atomic Resolution Structure of Monomorphic Aβ42 Amyloid Fibrils," Journal of the American Chemical Society, Aug. 2016, 138(30): 9663-9674.
Crippen, "Note: rapid calculation of coordinates from distance matrices," Journal of Computational Physics, Mar. 1978, 26(3): 449-452.
Da Silva et al., "Practical Characterization of Quantum Devices without Tomography," arXiv, Nov. 2011, 10 pages.
Deng et al., "Solid State NMR Characterization of Solid Surface of Heterogeneous Catalysts," Modern Magnetic Resonance, 2006, 7 pages.
Elena et al., "Direct spectral optimisation of proton-proton homonuclear dipolar decoupling in solid-state NMR," Chemical Physical Letters, Nov. 2004, 398(4-6): 532-538.
Ernst et al., "Chapter 12: Adiabatic Polarization-Transfer Methods in MAS Sectroscopy," in Solid-State NMR Studies of Biopolymers, 2010:213, 12 pages.
Evans et al., "Scalable Bayesian Hamiltonian learning," arXiv, Dec. 2019, 17 pages.
Facchi et al., "Unification of dynamical decoupling and the quantum Zeno effect," arXiv, Jan. 2004, 6 pages.
Faehrmann et al., "Randomizing multi-product formulas for improved Hamiltonian simulation," ArXiv, Sep. 2022, 24 pages.
Farhi et al., "A Quantum Approximate Optimization Algorithm," arXiv, Nov. 2014, 16 pages.
Gentile et al., "Learning models of quantum systems from experiments," Nature Physics, Apr. 29, 2021, 10 pages.
Giovannetti et al., "Quantum random access memory," arXiv, Mar. 2008, 4 pages.
Goldstein et al., "Isolation of a polypeptide that has lymphocyte-differentiating properties and is probably represented universally in living cells," Proceedings of the National Academy of Sciences, Jan. 1975, 72(1): 11-15.
Granade et al., "Robust online Hamiltonian learning," New Journal of Physics, Sep. 18, 2012, 32 pages.
Gullion, "Rotational-Echo, Double-Resonance NMR," in Modern Magnetic Resonance, 2008, pp. 713-718.
Haah et al., "Quantum Algorithm for Simulating Real Time Evolution of Lattice Hamiltonians, " arXiv, Oct. 2020, 37 pages.
Huang et al., "Information-Theoretic Bounds on Quantum Advantage in Machine Learning," Physical Review Letters, May 2021, 126(19), 8 pages.
Huang et al., "Power of data in quantum machine learning," Nature Communications, May 2021, 12(1), 9 pages.
Huang et al., "Provably efficient machine learning for quantum many-body problems," arXiv, Sep. 2022, 70 pages.
Huggins et al., "Efficient and noise resilient measurements for quantum chemistry on near-term quantum computers," NPJ Quantum Information, Feb. 2021, 7: 9 pages.
International Search Report and Written Opinion in International Appln. No. PCT/US2022/042505, mailed on Dec. 12, 2022, 17 pages.
Jaroniec, "Chapter 11: Dipolar recoupling: Heteronuclear," in Solid-State NMR Studies of Biopolymers, 2010, 19 pages.
Jones, "Composite pulses in NMR quantum computation," arXiv, Jun. 2009, 5 pages.
Kimmel et al., "Robust calibration of a universal single-qubit gate set via robust phase estimation," Physical Review A, Dec. 2015, 92(6): 15 pages.
Kivlichan et al., "Improved Fault-Tolerant Quantum Simulation of Condensed-Phase Correlated Electrons via Trotterization," arXiv, Jul. 2020, 45 pages.
Knill et al., "Optimal Quantum Measurements of Expectation Values of Observables," arXiv, Jul. 2006, 22 pages.

(56) References Cited

OTHER PUBLICATIONS

Ledbetter et al., "Optical detection of NMR J-spectra at zero magnetic field," Journal of Magnetic Resonance, Jul. 2009, 199(1): 25-29.
Lee et al., "Even More Efficient Quantum Computations of Chemistry Through Tensor Hypercontraction," PRX Quantum, Jul. 2021, 2(3), 62 pages.
Lesage et al., "Experimental aspects of proton NMR spectroscopy in solids using phase-modulated homonuclear dipolar decoupling," Journal of Magnetic Resonance, Jul. 2003, 163(1): 105-113.
Levenberg, "A Method for the Solution of Certain Non-linear Problems in Least Squares," Quarterly of Applied Mathematics, Jul. 1944, 2(2): 164-168.
Levitt, "Composite Pulses," Progress in Nuclear Magnetic Resonance Spectroscopy, Jan. 1986, 18(2), 1369-1411.
Low et al., "Hamiltonian Simulation by Qubitization," arXiv, Jul. 2019, 23 pages.
Low et al., "Hamiltonian Simulation in the Interaction Picture," arXiv, Jun. 2019, 30 pages.
Lowe, "Free Induction Decays of Rotating Solids," Physical Review Letters, Apr. 1959, 2(7): 285-287.
Macé et al., "Multifractal Scalings Across the Many-Body Localization Transition," arXiv, Oct. 2019, 12 pages.
Madhu, "High-resolution solid-state NMR spectroscopy of protons with homonuclear dipolar decoupling schemes under magic-angle spinning," Solid State Nuclear Magnetic Resonance, Feb. 2009, 35(1): 2-11.
Marquardt, "An Algorithm for Least-Squares Estimation of Nonlinear Parameters," Journal of the society for Industrial and Applied Mathematics, Jun. 1963, 11(2): 431-441.
Mi et al., "Observation of Time-Crystalline Eigenstate Order on a Quantum Processor," arXiv, Aug. 2021, 16 pages.
Mi, "Information scrambling in computationally complex quantum circuits," ArXiv, Jan. 2021, 32 pages.
Mitarai et al., "Quantum circuit learning," arXiv, Mar. 2, 2018, 5 pages.
Moitra, "Super-resolution, Extremal Functions and the Condition Number of Vandermonde Matrices, " arXiv, Apr. 2015, 19 pages.
Neill et al., "Accurately computing the electronic properties of a quantum ring," arXiv, Jun. 2021, 34 pages.
Nonappa et al., "Solid state NMR studies of gels derived from low molecular mass gelators," Soft Matter, Jun. 2016, 12(28): 6015-6026.
Paravastu et al., "Frequency-selective homonuclear dipolar recoupling in solid state NMR," Journal of Chemical Physics, May 2006, 124(19), 15 pages.
Peng et al., "Simulating Large Quantum Circuits on a Small Quantum Computer," arXiv, Dec. 2020, 20 pages.
Preskill, "Quantum computing in the NISQ era and beyond," arXiv, Jul. 2018, 20 pages.
Rabi et al., "A New Method of Measuring Nuclear Magnetic Moment," Physical Review, Feb. 1938, 53(4): 318.
Reiher et al., "Elucidating reaction mechanisms on quantum computers," Proceedings of the National Academy of Sciences, Jul. 2017, 114(29): 7555-7560.
Rubin et al., "Application of fermionic marginal constraints to hybrid quantum algorithms," New Journal of Physics, May 2018, 20(5), 21 pages.
Sakellariou et al., "Homonuclear dipolar decoupling in solid-state NMR using continuous phase modulation," Chemical Physics Letters, Mar. 2000, 319(3-4): 253-260.
Sanders et al., "Compilation of Fault-Tolerant Quantum Heuristics for Combinatorial Optimization," PRX Quantum, Nov. 2020, 70 pages.
Sels et al., "Quantum approximate Bayesian computation for NMR model inference, "arXiv, Oct. 2019, 13 pages.
Serbyn et al., "Local Conservation Laws and the Structure of the Many-Body Localized States," arXiv, Sep. 2013, 7 pages.
Sergeevich et al., "Optimizing qubit Hamiltonian parameter estimation algorithm using PSO," Proceedings from IEEE Congress on Evolutionary Computation (CEC 2012), Jun. 2012, 3 pages.
Sinnaeve, "Selective homonuclear 2D J-resolved spectroscopy," eMagRes, 2020, 9(4): 267-282.
Somma et al., "Parameter estimation with mixed-state quantum computation," arXiv, Apr. 2008, 12 pages.
Srednicki, "The approach to thermal equilibrium in quantized chaotic systems," arXiv, Nov. 1998, 15 pages.
Sung et al., "Observation of separated dynamics of charge and spin in the Fermi-Hubbard model," arXiv, Oct. 2020, 20 pages.
Theis et al., "Parahydrogen-enhanced zero-field nuclear magnetic resonance," Nature Physics, May 2011, 7: 571-575.
Tran et al., "Faster Digital Quantum Simulation by Symmetry Protection," PRX Quantum 2, Feb. 2021, 28 pages.
Tycko et al., "Chapter 10: Homonuclear dipolar recoupling in solid-state NMR," in Solid-State NMR Studies of Biopolymers, 2010, 14 pages.
Valenti et al., "Scalable Hamiltonian learning for large-scale out-of-equilibrium quantum dynamics," arXiv, Mar. 2021, 13 pages.
Vandersypen et al., "NMR techniques for quantum control and computation," arXiv, Jun. 2004, 33 pages.
Vinogradov et al., "High-resolution proton solid-state NMR spectroscopy by phase-modulated Lee-Goldburg experiment," Chemical Physics Letters, Dec. 1999, 314(5-6): 443-450.
Virtanen et al., "SciPy 1.0: fundamental algorithms for scientific computing in Python," Nature Methods, Feb. 2020, 17: 261-272.
Von Burg et al., "Quantum computing enhanced computational catalysis," Physical Review Research, 3: 16 pages.
Wallman et al., "Noise tailoring for scalable quantum computation via randomized compiling," Physical Review A, Nov. 18, 2016, 94(5):52325, 9 pages.
Wang et al., "Experimental quantum Hamiltonian Learning," arXiv, Mar. 15, 2017, 6 pages.
Wang et al., "Hamiltonian tomography for quantum many-body systems with arbitrary couplings," New Journal of Physics, Sep. 2015, 17: 10 pages.
Wecker et al., "Progress towards practical quantum variational algorithms," Physical Review A, Oct. 2015, 92(4), 11 pages.
Whitfield et al., "Simulation of electronic structure Hamiltonians using quantum computers," arXiv, Dec. 2010, 22 pages.
Wiebe et al., "Hamiltonian learning and certi cation using quantum resources," arXiv, Sep. 2013, 16 pages.
Wiebe et al., "Quantum Hamiltonian learning using imperfect quantum resources," arXiv, Apr. 2014, 18 pages.
Wimperis et al., "Broadband, Narrowband, and Passband Composite Pulses for Use in Advanced NMR Experiments," Journal of Magnetic Resonance, Series A, Aug. 1994, 109(2): 221-231.
Wu et al., "Strong Quantum Computational Advantage Using a Superconducting Quantum Processor," arXiv, Jun. 2021, 22 pages.
Wu et al., "Variational Thermal Quantum Simulation via Thermofield Double States," arXiv, Nov. 2018, 7 pages.
Zhao et al., "Fermionic Partial Tomography via Classical Shadows," arXiv, Oct. 2020, 31 pages.
McDermott et al., Solid state NMR studies of biopolymers, John Wiley & Sons, Dec. 2012, 572 pages.
Office Action in Indian Appln. No. 202417015401, mailed on Jun. 11, 2025, 6 pages (with English translation).
International Preliminary Report on Patentability in International Appln. No. PCT/US2022/042505, mailed on Mar. 14, 2024, 10 pages.
Office Action in Canadian Appln. No. 3,230,750, mailed on Aug. 12, 2025, 4 pages.
Office Action in European Appln. No. 22777488.2, mailed on Jun. 9, 2026, 11 pages.
Kieferova et al., "Quantum Generative Training Using Rényi Divergences" quant-ph, Submitted on Jun. 17, 2021, arXiv:2106.09567v1, 30 pages.
Office Action in Australian Appln. No. 2025204428, mailed on Jun. 29, 2026, 4 pages.

* cited by examiner

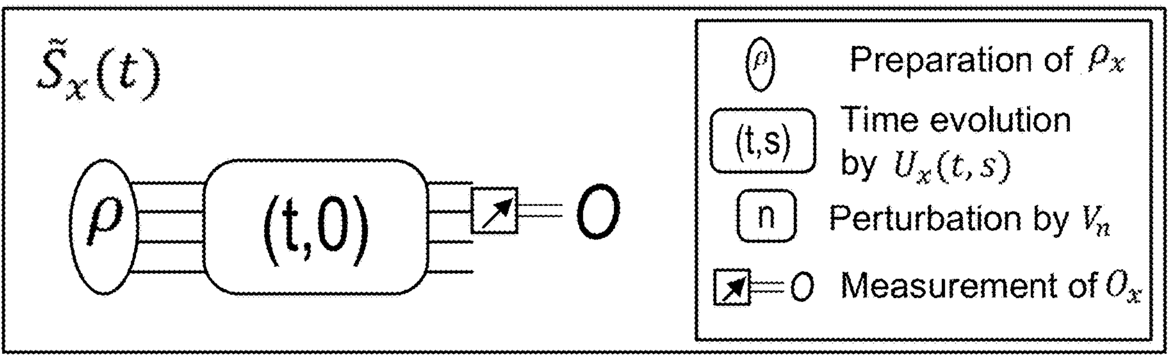
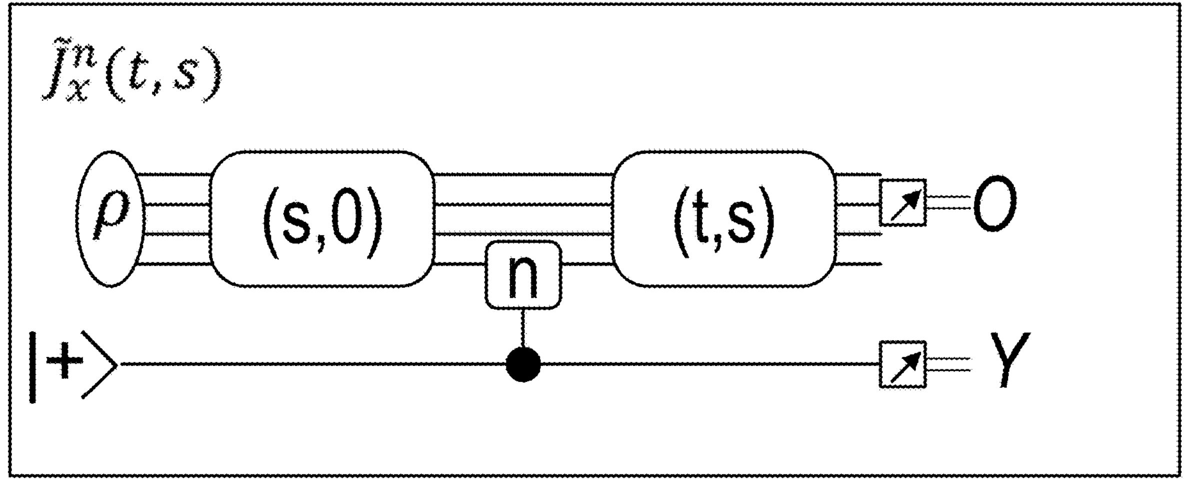
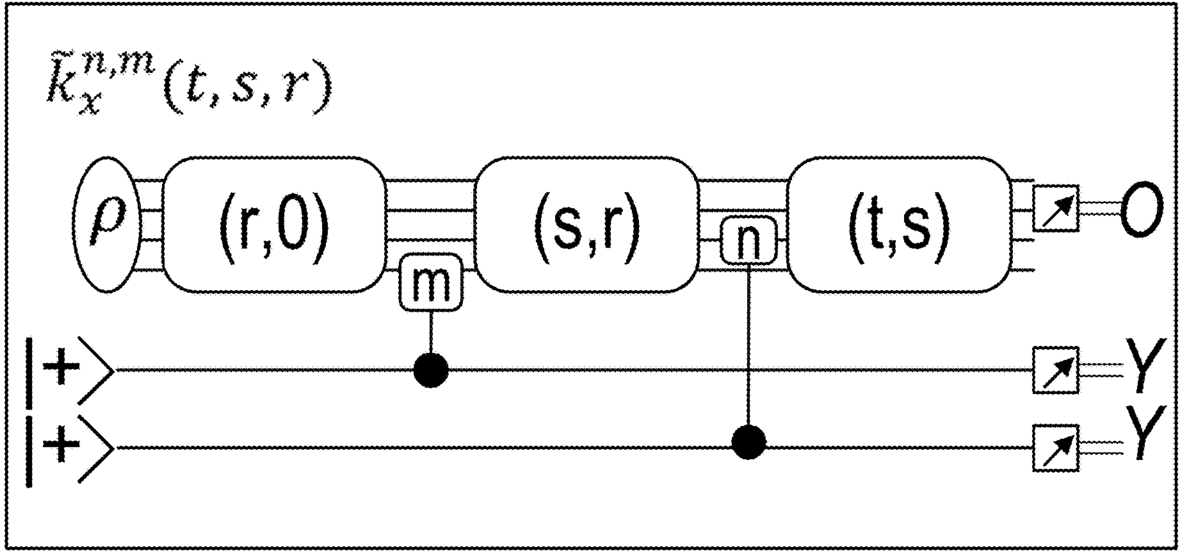
FIG. 3

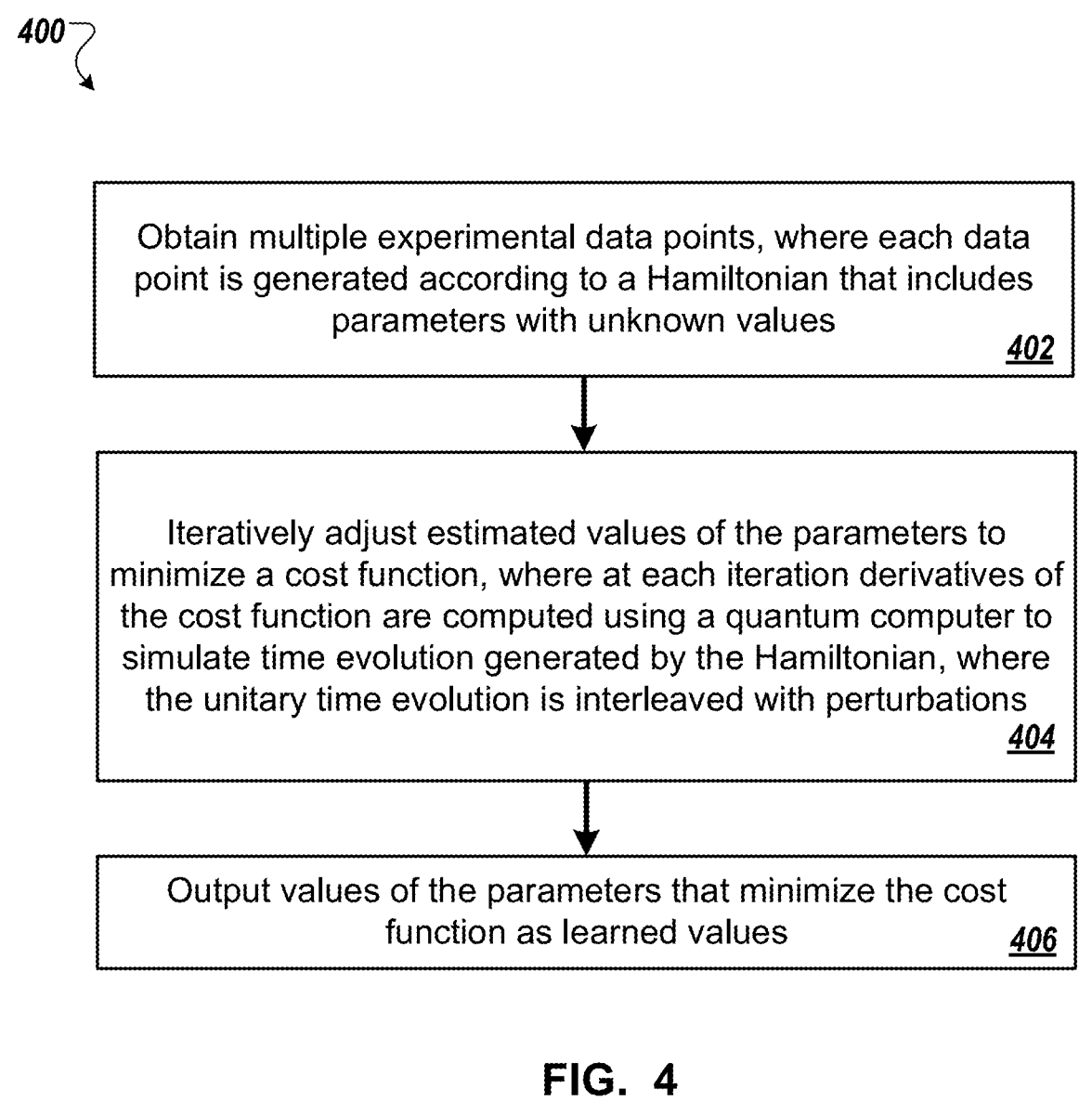

400

Obtain multiple experimental data points, where each data point is generated according to a Hamiltonian that includes parameters with unknown values
402

Iteratively adjust estimated values of the parameters to minimize a cost function, where at each iteration derivatives of the cost function are computed using a quantum computer to simulate time evolution generated by the Hamiltonian, where the unitary time evolution is interleaved with perturbations
404

Output values of the parameters that minimize the cost function as learned values
406

FIG. 4

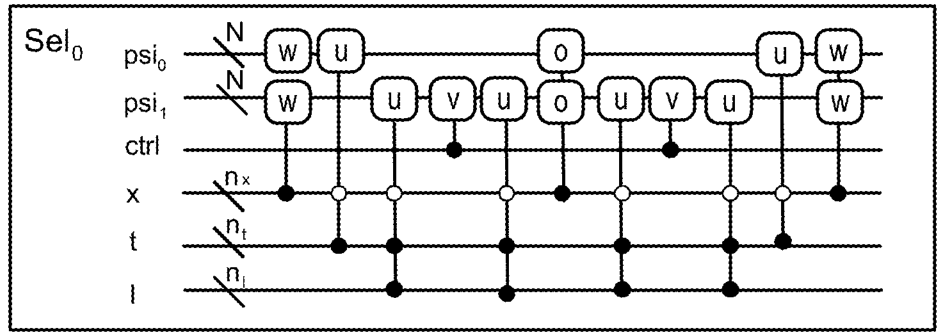
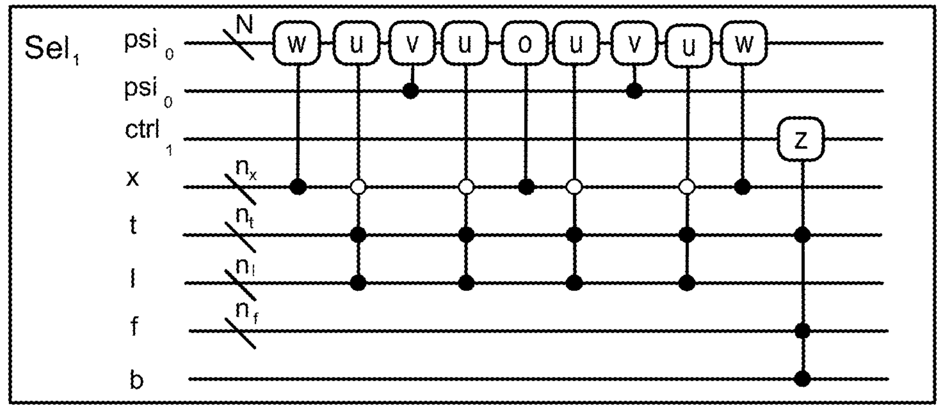
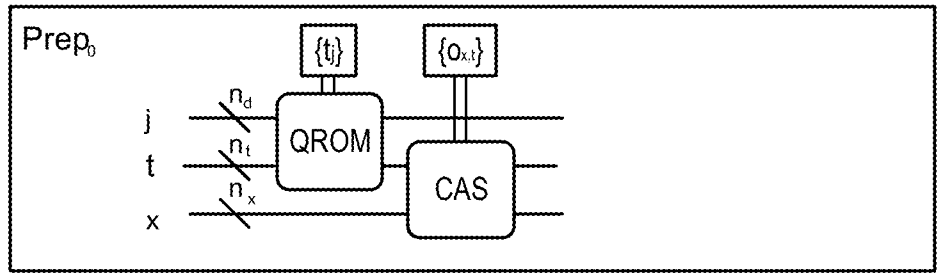
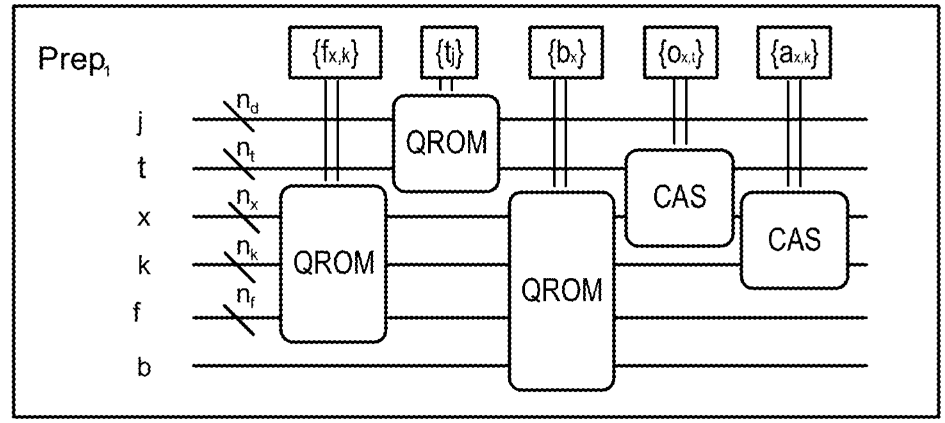
FIG. 6

Obtain multiple experimental data points, where each data point is generated according to a Hamiltonian that includes parameters with unknown values

702

Iteratively adjust estimated values of the parameters to minimize a cost function, where at each iteration derivatives of the cost function are computed using a quantum computer to calculate derivatives of the cost function using block encoding

704

Output values of the parameters that minimize the cost function as learned values

GRADIENT-BASED QUANTUM ASSISTED HAMILTONIAN LEARNING

CROSS-REFERENCE TO RELATED APPLICATIONS

This application claims the benefit under 35 U.S.C. § 119(e) of U.S. Patent Application No. 63/240,787, filed Sep. 3, 2021. The disclosure of the foregoing application is incorporated herein by reference in its entirety for all purposes.

BACKGROUND

Hamiltonian learning is the inverse problem to predicting experimental outcomes given a system Hamiltonian. Hamiltonian learning can be used for device characterization or for learning the structure of an unknown quantum system. Sufficiently small devices can be characterized via classical post-processing of experimental data using Bayesian, maximum-likelihood, or machine-learning methods. Exact methods are impossible in large systems whenever the forward problem becomes beyond-classical. Given sufficient control, the experiment can be prevented from becoming beyond-classical by performing experiments that target small subsystems via dynamical decoupling pulses. Given sufficient control, this can be achieved by applying pulses to dynamically decouple the subsystem from its environment. It is also possible to learn Hamiltonians from expectation values of thermal or long-time average states, which are more easy to classically approximate. However, when neither technique is possible, the Hamiltonian learning problem becomes classically challenging, giving a potential beyond-classical quantum computing application.

SUMMARY

This specification describes systems, methods, devices, and other techniques for gradient-based quantum assisted Hamiltonian learning.

In general, one innovative aspect of the subject matter described in this specification can be implemented in a method that includes obtaining, by a classical processor, multiple experimental data points, wherein each experimental data point is generated according to a Hamiltonian comprising parameters with unknown values; learning, by the classical processor, values of the parameters, comprising iteratively adjusting, by the classical processor and until predetermined completion criteria are met, estimated values of the parameters to minimize a cost function, wherein the cost function is dependent on the multiple experimental data points and at each iteration derivatives of the cost function with respect to respective estimated values of the parameters for the previous iteration are computed using a quantum computer.

Other implementations of this aspect include corresponding classical, quantum or classical-quantum computer systems, apparatus, and computer programs recorded on one or more computer storage devices, each configured to perform the actions of the methods. A system of one or more classical and quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the experimental data points correspond to respective experiments performed on a quantum system, wherein the experiments comprise beyond-classical experiments.

In some implementations the classical processor obtains the experimental data points from a spectrometer through a classical connection.

In some implementations the quantum computer comprises a noisy intermediate scale quantum computing device.

In some implementations computing derivatives of the cost function with respect to estimated values of the parameters for the previous iteration using a quantum computer comprises using the quantum computer to simulate unitary time evolution generated by the Hamiltonian, wherein the unitary time evolution is interleaved with perturbations comprising Hermitian operators included in the Hamiltonian.

In some implementations the derivatives comprise gradients, and wherein each gradient of the cost function comprises multiple integrals, each integral comprising a respective integrand, wherein each integrand comprises an expectation value of i) an observable used to generate the multiple experimental data points given ii) a perturbed state of a quantum system used to generate the multiple experimental data points, wherein the state is perturbed using a Hermitian operator included in the Hamiltonian.

In some implementations using a quantum computer to compute derivatives of the cost function with respect to estimated values of the parameters for the previous iteration comprises: sending, from the classical processor and to the quantum computer, data requesting computation of each integrand of the multiple integrals; and receiving, by the classical processor and from the quantum computer, data representing results of the computation of each integrand of the multiple integrals.

In some implementations the method further comprises computing, by the classical processor, the multiple integrals through summation of the data representing results of the computation of each integrand of the multiple integrals; performing, by the classical processor, multiplication and addition operations using the computed multiple integrals to compute first derivatives of the cost function with respect to estimated values of the parameters for the previous iteration.

In some implementations the method further comprises: repeatedly for a predetermined number of repetitions: preparing, by the quantum computer, a register of qubits in an initial quantum state, the initial quantum state comprising a mixed diagonal state in the computational basis; applying, by the quantum computer, a quantum circuit to the initial quantum state to obtain an evolved quantum state, the quantum circuit comprising a unitary time evolution operator interleaved with controlled perturbations, wherein the unitary time evolution operator simulates unitary time evolution generated by the Hamiltonian and the controlled perturbations comprise Hermitian operators included in the Hamiltonian; and measuring an observable of the evolved quantum state, the observable comprising the observable used to generate the multiple experimental data points; and computing an expectation value of the measured observables.

In some implementations the quantum computer comprises a fault tolerant quantum computing device.

In some implementations computing derivatives of the cost function with respect to estimated values of the parameters for the previous iteration using a quantum computer comprises using block encoding to calculate the derivatives of the cost function.

In some implementations using a quantum computer to compute derivatives of the cost function with respect to estimated values of the parameters for the previous iteration comprises: sending, from the classical processor and to the quantum computer, data requesting computation of the derivatives of the cost function; and receiving, by the classical processor and from the quantum computer, data representing results of the computation of the derivatives of the cost function.

In some implementations the method further comprises: initializing, by the quantum computer, a control register of qubits in an initial state; applying, by the quantum computer, a preparation unitary operator to the initial state to obtain a control state of the control register; and applying, by the quantum computer, a select unitary operator to the control state to obtain an evolved state of the control register, wherein the select unitary operator selects a unitary operator to implement based on the control state of the control register; and measuring the evolved state of the control register.

In some implementations each experimental data point corresponds to a respective experiment performed on a quantum system and wherein performing the respective experiment comprises: preparing the quantum system in an initial state; applying a time evolution operator to the initial state to generate an evolved state, wherein the time evolution operator is generated by the Hamiltonian and an external time-dependent driving field; and measuring an observable of the evolved state.

In some implementations the number of experimental data points is greater than or equal to the number of parameters with unknown values.

In some implementations the Hamiltonian comprises a linear combination of terms, each term comprising a respective parameter and a respective Hermitian operator.

In some implementations the cost function comprises a first term and a second term, wherein the first term comprises a sum of squared differences between estimated values of the parameters and a prior of the parameters; and the second term comprises a sum of squared differences between experimental data points estimated using estimated values of the parameters and the obtained experimental data points.

In some implementations the derivatives comprise second order derivatives, and wherein each second order derivative of the cost function comprises multiple integrals, each integral comprising an integrand, wherein the integrand comprises: an expectation value of i) an observable used to generate the multiple experimental data points given ii) a perturbed state of a quantum system used to generate the multiple experimental data points, wherein the state is perturbed using a Hermitian operator included in the Hamiltonian; or an expectation value of i) an observable used to generate the multiple experimental data points given ii) a commutator of a first Hermitian operator included in the Hamiltonian with a perturbed state of a quantum system used to generate the multiple experimental data points, wherein the state is perturbed using a second Hermitian operator included in the Hamiltonian.

In some implementations the derivatives comprise second order derivatives, and wherein when a value of the cost function is within a predetermined distance from a global minimum, the second order derivatives of the cost function comprise a sum of products of integrals, each integral comprising an integrand, wherein the integrand comprises an expectation value of i) an observable used to generate the multiple experimental data points given ii) a perturbed state of a quantum system used to generate the multiple experimental data points, wherein the state is perturbed using a Hermitian operator included in the Hamiltonian.

The subject matter described in this specification can be implemented in particular embodiments so as to realize one or more of the following advantages.

The presently described techniques can be used for learning parameters of a Hamiltonian, e.g., a molecular nuclear spin Hamiltonian, from time-resolved measurements, e.g., measurements of spin-spin correlators. The techniques can be implemented by both NISQ devices as well as fault-tolerant devices, where clear asymptotic speedups can be achieved. In addition, the presently described techniques can be applied to classically intractable NMR experiments, e.g., experiments where dipolar couplings are strong and cannot be simply removed.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 shows example circuit diagrams for estimating experimental data points and integrands required to calculate first and second order derivatives of the Hamiltonian learning cost function.

FIG. 4 is a flowchart of a first example process for Hamiltonian learning.

FIG. 6 shows example circuit diagrams for fault tolerant oracles used to calculate first and second order derivatives of the Hamiltonian learning cost function.

FIG. 7 is a flowchart of a second example process for Hamiltonian learning.

Like reference numbers and designations in the various drawings indicate like elements.

DETAILED DESCRIPTION

Overview

This specification describes techniques for learning unknown Hamiltonian parameters, e.g., the parameters of a nuclear spin Hamiltonian of a molecular or material system, using a digital quantum computer and time-resolved measurements, e.g., from an NMR spectroscopy experiment. The techniques provide a beyond-classical quantum computation whenever the experiment is hard to classically simulate. The techniques include quantum algorithms to estimate the cost function, gradients and Hessian of the learning problem, giving implementations for both NISQ and FT cost models.

Example Operating Environment

Figure 1:
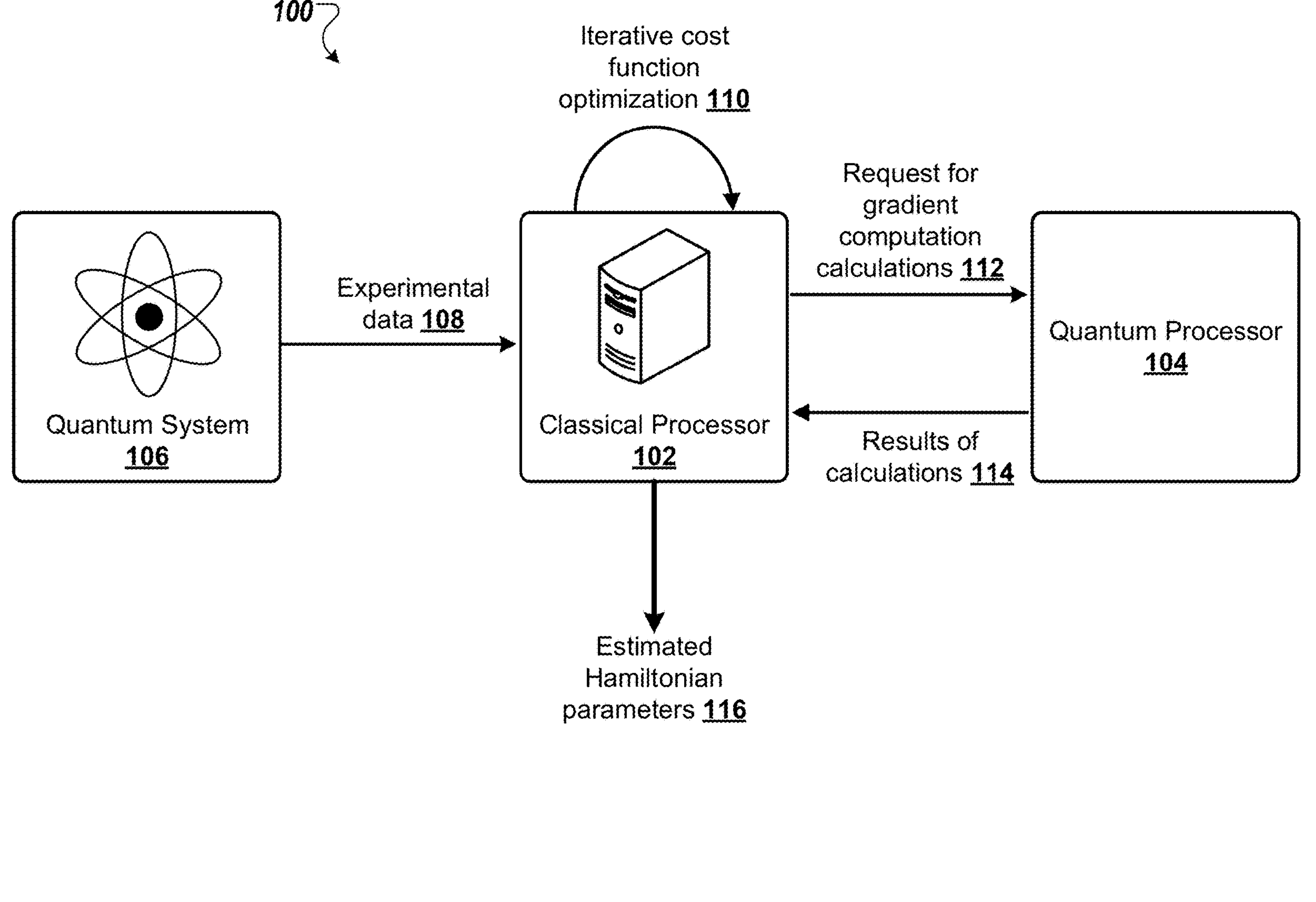
FIG. 1 shows a conceptual block diagram of an example system for Hamiltonian learning.

FIG. 1 shows a conceptual block diagram of an example system 100 for Hamiltonian learning. The example system 100 includes a classical processor 102 and a quantum processor 104. The classical processor 102 and quantum processor 104 can exchange electronic communications over one or more networks, or can exchange communications in another way, such as over one or more wired or wireless connections.

The classical processor 102 is configured to perform classical computations. The quantum processor 104 is configured to perform quantum computations. For convenience, the classical processor 102 and quantum processor 104 are illustrated as separate entities. For example, the quantum processor 104 can be a quantum processor that is operated by an external third party. However, in some implementations the classical processor 102 can be included in the quantum processor 104. That is, the quantum processor 104 can also include components for performing classical computing operations. Generally, the classical computing components of the classical processor can be implemented as one or more classical computers having physical hardware like that described with respect to FIG. 9 and the quantum computing components of the quantum processor 104 can be implemented as quantum computing devices having physical hardware like that described with respect to FIG. 8.

The classical processor 102 is configured to perform gradient-based Hamiltonian learning using the quantum processor 104. That is, the classical processor 102 is configured to learn a Hamiltonian H of some quantum system 106 from a set of time-resolved experimental data $S_x(t)$ 108 obtained from the quantum system 106, where x indexes different sets of experiments.

The classical processor 102 can receive the experimental data 108 as input from an external party or can probe the quantum system 106, e.g., using the quantum processor 104 or another quantum processor or sensor, and generate the experimental data 108. The experimental data 108 includes multiple experimental data points, where each experimental data point is generated according to a Hamiltonian including one or more parameters with unknown values. Each data point corresponds to a respective experiment, where the experiment consists of an initial quantum state preparation $\rho_x$, time evolution of the initial quantum state by the Hamiltonian to be learned and an external time-dependent driving Hamiltonian $H_x(t)$, and final measurement of an observable $O_x$. The resulting data point (also referred to herein as a signal) $S_x(t)$ is then given by $$S_x(t) = \mathrm{Trace}\left[U_x(t, 0)\rho_x U_x^\dagger(t, 0)O_x\right], \tag{1}$$

where $U_x(t_2, t_1)$ is the time evolution operator generated by the combined Hamiltonian $H+H_x(t)$ from $t=t_1$ to $t_2$ $$U_x(t_2, t_1) = \mathcal{T}\exp\left\{i\int_{t_1}^{t_2}[H + H_x(t)]dt\right\}. \tag{2}$$

In some implementations the initial quantum state and observable can be independent of the experiment x, e.g., $\rho_x=\rho$ and $O_x=O$, by encoding preparation and measurement terms onto the driving Hamiltonian $H_x(t)$ (this can provide a more accurate description of a real-world experiment.) Alternatively, if the driving Hamiltonian $H_x(t)$ is only used for preparation and measurement, this may be encoded entirely on $\rho_x$ and $O_x$, setting $H_x(t)=0$ and $U_x(t_2,t_1)=U(t_2, t_1)=e^{iH}(t_2-t_1)$.

To define the learning problem performed by the classical processor 102, the Hamiltonian to be learned can be written in the form $$H = \sum_n h_n V_n, \tag{3}$$

where $h_n$ are a set of Hamiltonian parameters and $V_n$ a set of Hermitian operators. Any Hamiltonian can be written in this form. In some implementations some or all values of the $h_n$ are unknown. The classical processor 102 is configured to perform Hamiltonian learning according to the techniques described in this specification to compute estimates of these unknown values $$\{\tilde{h}_n\}.$$

To perform the Hamiltonian learning, the classical processor iteratively adjusts estimated values of the unknown parameters to minimize a cost function (or maximize, depending on the form of cost function chosen) until predetermined completion criteria are met, e.g., the value of the cost function converges to within an acceptable/predefined threshold. The cost function may be a likelihood function, or based on a likelihood function. For example, given a prior $$\{h_n^{(0)}\}$$

with standard deviation $\omega_n$, and assuming that each data point $S_x(t)$ is drawn from an experimental population with standard deviation $$\sigma_{x,t}^2,$$

the cost function can be given by $$C[\tilde{H}] = \sum_n \frac{\left(\tilde{h}_n - h_n^{(0)}\right)^2}{2\omega_n^2} + \sum_{x,t}\frac{\left(\tilde{S}_x(t) - S_x(t)\right)^2}{2\sigma_{x,t}^2}, \tag{4}$$

where $\tilde{S}_x(t)=\mathrm{Trace}[\tilde{U}_x(t,0)\rho_x\tilde{U}^\dagger_x(t, 0)O_x]$ is the estimated signal with the estimates of the parameters $\tilde{h}_n$. (Throughout this specification, tildes denote quantities derived from estimated parameters rather than hidden ones.)

Though $\tilde{S}_x(t)$ cannot be estimated on a classical device, implementing it on a quantum computer only requires a circuit to simulate the time evolution $\tilde{U}_x(t, 0)$. However, performing such an optimization gradient-free is typically impractical. Therefore, at each iteration the classical processor 102 computes derivatives of the cost function with respect to estimated values of the one or more parameters for the previous iteration. The derivatives can include first order derivatives (gradients) and second order derivatives (Hessian) of the cost function. These derivatives may be given by $$\frac{dC[\tilde{H}]}{d\tilde{h}_n} = \frac{1}{\omega_n^2}\left(\tilde{h}_n - h_n^{(0)}\right) + \sum_{x,t} \frac{i}{\sigma_{x,t}^2}\left[\tilde{S}_x(t) - S_x(t)\right]\tilde{J}_x^n(t) \tag{5}$$

$$\frac{d^2C[H]}{d\tilde{h}_n d\tilde{h}_m} = \frac{\delta_{nm}}{\omega_n^2} - \sum_{x,t} \frac{1}{\sigma_{x,t}^2}\left[\tilde{J}_x^n(t)\tilde{J}_x^m(t) + 2\left[\tilde{S}_x(t) - S_x(t)\right]\tilde{K}_x^{n,m}(t)\right], \tag{6}$$

where $$\tilde{J}_x^n(t) = \int_0^t ds \tilde{j}_x^n(t, s), \tag{7}$$

$$\tilde{j}_x^n(t, s) = \mathrm{Trace}\left[O_x\left[\tilde{V}_{n,x}(t, s), \tilde{\rho}_x(t)\right]\right], \tag{8}$$

$$\tilde{K}_x^{n,m}(t) = \int_0^t ds \int_0^s dr k_x^{n,m}(t, s, r), \tag{9}$$

$$\tilde{k}_x^{n,m}(t, s, r) = \mathrm{Trace}\left[O_x\left[\tilde{V}_{n,x}(t, s), \left[\tilde{V}_{m,x}(t, r), \tilde{\rho}_x(t)\right]\right]\right], \tag{10}$$

and $\tilde{V}_{n,x}(t,s)=\tilde{U}_x(t,s)V_n\tilde{U}^\dagger_x(t,s)$ is the (estimated) operator $V_n$ evolved forwards in time from s tot, and $\tilde{\rho}_x(t)=\tilde{U}_x(t,0)\rho_x\tilde{U}^\dagger_x(t, 0)$ is the (estimated) state $\rho_x$ at time t. That is, the gradient of the cost function includes multiple integrals (e.g. given by Eq. 7), each integral including a respective integrand (e.g. given by Eq. 8), where the integrand is given by an expectation value of i) the observable $O_x$ used to generate the multiple experimental data points 108 given ii) a perturbed state of the quantum system used to generate the multiple experimental data points 108, where the state is perturbed using a Hermitian operator In included in the Hamiltonian (e.g. see Eq. 3).

Since the term dependent on $$\tilde{K}_x^{n,m}(t)$$

in Eq. 6 disappears in the limit $\tilde{S}_x(t)\rightarrow S_x(t)$, in some implementations it may be practical when near the global minimum of C[H] for the classical processor 102 to approximate $$\frac{d^2C[H]}{d\tilde{h}_n dh_m} = \frac{\delta_{nm}}{\omega_n^2} - \sum_{x,t} \frac{\tilde{J}_x^n(t)\tilde{J}_x^m(t)}{\sigma_{x,t}^2}, \tag{11}$$

which may be obtained at no extra cost to the gradient estimation. The covariance matrix 2 of the final estimation of the $\{\tilde{h}_n\}$ can then be estimated as $$\sum = \left[\nabla_{\tilde{h}}^2 C\right]^{-1} \tag{12}$$

The classical processor 102 uses the quantum processor 104 to compute the first and second order derivatives, e.g., as given in Eq. 5 and 6. For example, at each iteration the classical processor 102 can send requests 112 to the quantum processor 104 to compute some or all of the calculations required to determine the derivatives given in Eq. 5 and 6 for the current iteration. The classical processor 102 can then receive 114 data representing results of the requested computations and use these results in the iterative optimization of the cost function.

The type of computations requested by the classical processor 102 can vary based on the computational resources included in the quantum processor 104. For example, as described below with reference to FIG. 2, in some implementations the quantum processor 104 can include a noisy intermediate scale quantum (NISQ) device 202. In these implementations the classical processor 102 can outsource some of the calculations required to determine the derivatives, e.g., calculation of the integrands of Eq. 8 and 10. As another example, as described below with reference to FIG. 5, in some implementations the quantum processor 104 can include a fault tolerant (FT) quantum device 502. In these implementations the classical processor 102 can outsource the direct task of determining the derivatives given in Eq. 5 and 6 (or the second term of Eq. 5 and 6).

When the iterative optimization of the cost function satisfies the predetermined completion criteria, the classical processor 102 can provide estimated values 116 of the unknown Hamiltonian parameters $\{\tilde{h}_n\}$ as output. The estimated values can be used to determine properties of the quantum system that generated the experimental data, e.g., to determine the molecular and/or crystalline structure of unknown compounds.

The Hamiltonian learning process performed by the classical processor 102 can be made robust, e.g., to avoid being stuck in local minima. Consider a time-independent Hamiltonian ($H_x(t)=0$). In this case, working in the eigenbasis $|\xi_a\rangle$ of the system Hamiltonian $H|\xi_a\rangle = E_a|\xi_a\rangle$ and inserting two resolutions of the identity, the signal then takes the form $$S_x(t) = \sum\nolimits_{a,b} s_x^{a,b}(t), \text{ where}$$

$$s_x^{a,b}(t) = \langle\xi_a|\rho_x|\xi_b\rangle\langle\xi_b|O_x|\xi_a\rangle e^{i(E_a-E_b)t}. \tag{13}$$

If the estimate deviates by some parameter $h_n\rightarrow\tilde{h}_n=h_n+\delta$, then (to lowest order in perturbation theory) the estimated signal takes the form $$\tilde{S}_x(t) = \sum_{a,b} \tilde{s}_x^{a,b}(t) + \delta X, \tag{14}$$

$$\tilde{s}_x^{a,b}(t) = s_x^{a,b}(t)e^{it\delta(\langle\xi_a|V_n|\xi_a\rangle - \langle\xi_b|V_n|\xi_b\rangle)} \tag{15}$$

where X is a δ-independent constant that comes from the first order correction to the wavefunctions $|\xi_a\rangle$. The second term in the cost function (Eq. 4) then takes the form $$\sum_{x,t} \frac{\left(\tilde{S}_x(t) - S_x(t)\right)^2}{2\sigma_{x,t}^2} = \sum_{x,t} \frac{1}{\sigma_{x,t}^2}\left[\delta X + s_x^{(a,b)}(t)\left(1 - e^{it\delta(\langle\xi_a|V_n|\xi_a\rangle - \langle\xi_b|V_n|\xi_b\rangle)}\right)\right]^2, \tag{16}$$

which oscillates as a function of δ with a frequency bounded by 4t $\max\langle\xi_a|V_n|\xi_a\rangle$, which is independent of the system size. This implies that if the initial guess $$h_n^{(0)}$$

of the parameters $h_n$ lies within some δ, e.g., $$\delta \le \sum\nolimits_n \left|h_n - h_n^{(0)}\right|,$$

and each $V_n$ is defined to have spectrum within [−1, 1], the classical processor 102 can perform robust Hamiltonian learning by first learning H from only experiments at times $$t < t_{max} = \frac{\pi}{4\delta \max\limits_n \|V_n\|}. \quad (17)$$

After converging on this data, the variance of the parameter guess can be estimated (using Eq. 6), the estimate of δ can be refined, and the range of allowed t increased. Assuming that estimation at each $t_{max}$ yields an error $\delta \le c/t_{max}$ for some c<1, repeating this procedure over multiple orders will converge to some final error ∈ in O(|log(€)|) steps.

The algorithms described in this specification for calculating the cost function C[H] and its first and second derivatives can be applied to different types of quantum computers, e.g., NISQ devices and FT devices. Quantum algorithm optimization is significantly different when targeting noisy near-term vs FT long-term devices. In either case, the integral in Eq. 8 is discretized $$\int_0^t dsf(s) \sim \sum_{i=0}^{I-1} z_i f(s_i), \quad (18)$$

where the weights $z_i > 0$ are chosen such that $\Sigma_i z_i = t$. (A 2-dimensional discretization is similarly possible for the integral $$K_x^{n,m}(t)).$$

There are different methods for choosing both the weights and the points $s_i$. For example, a trapezoidal or midpoint rule can be used. As another example, more complicated Gaussian quadrature methods can be used, or a Monte Carlo approach can be taken and the points can be chosen at random. Each method incurs a discretization error that goes to 0 as I→∞. Both the FT and NISQ quantum method described below have a cost that depends primarily on $[\Sigma_i z_i] = t$, and has only at most a logarithmic dependence on I. This allows the method of integration to be chosen for simplicity or ease in circuit design (and associated gate implementations and physical qubit control requirements), rather than focusing on optimizing for the discretization error.

Systems, Algorithms and Circuits for Near-Term Quantum Computers

Figure 2:
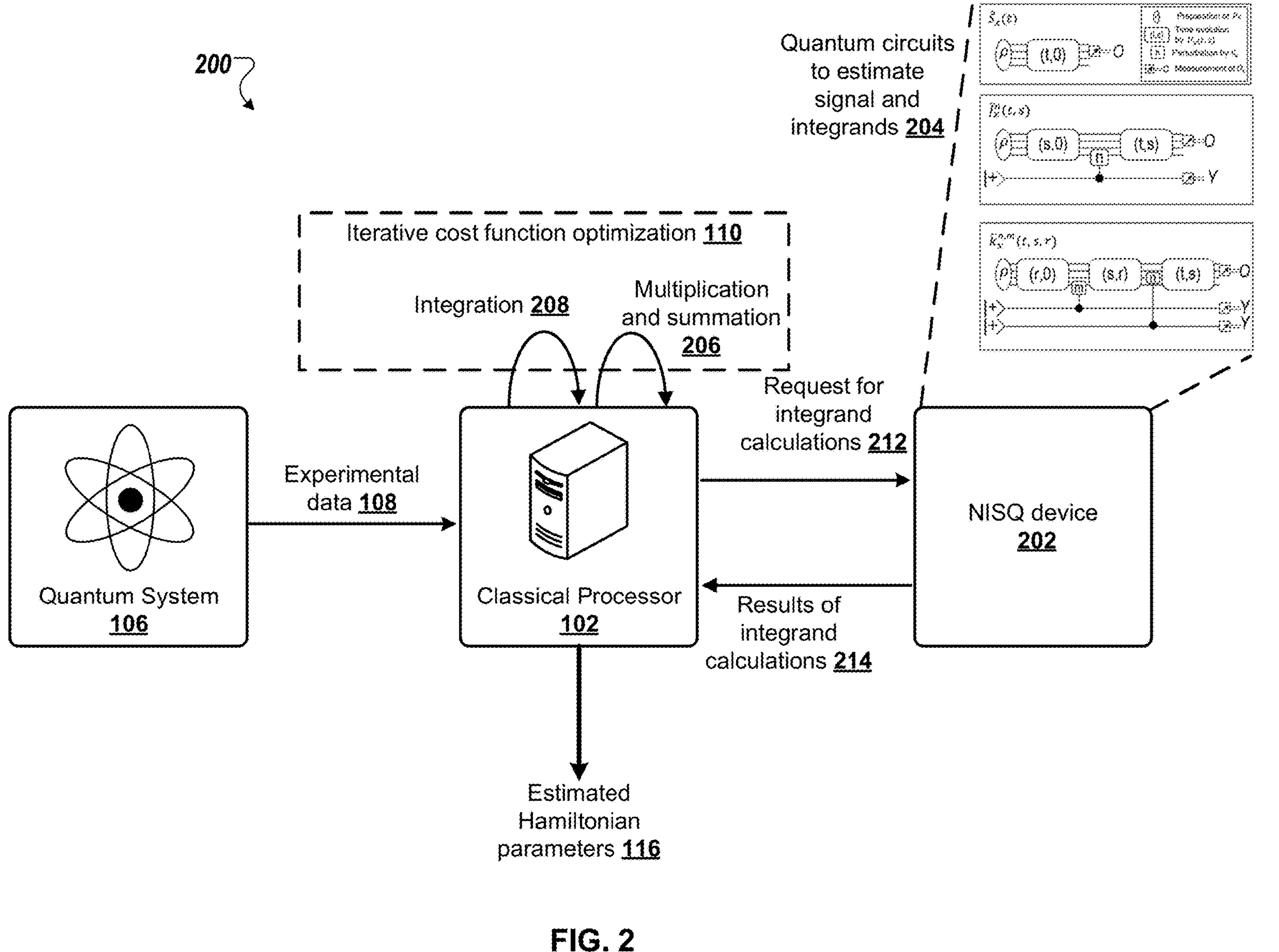
FIG. 2 shows a conceptual block diagram of an example system for Hamiltonian learning using a noisy intermediate scale quantum device.

FIG. 2 shows a conceptual block diagram of an example system 200 for Hamiltonian learning using a noisy intermediate scale quantum (NISQ) device 202. Example system 200 includes similar components to those included in example system 100 of FIG. 1, except the quantum processor 104 of FIG. 1 is a NISQ device 202.

In the NISQ era it is beneficial to run the shortest quantum circuits possible for any application. To this end, in implementations where the quantum processor 104 of FIG. 1 is a NISQ device 202, only some of the calculations required to compute the gradient or Hessian of the cost function are computed using the NISQ device 202. In particular, the classical processor 102 can send data 212 requesting that the NISQ device 202 perform calculations to compute the signal $\tilde{S}_x(t)$, and the integrands $$\tilde{J}_x^n(t) \text{ and } \tilde{K}_x^{n,m}(t).$$

The classical processor 102 can use data representing results of the integrand and signal calculations 214 to classically compute $dC[H]/dh_n$ and $d^2C[H]/dh_n dh_m$ by performing the required integration 208, multiplication and summation operations 206 (see Eq. 5, 6, 7, 9). This gives an exponential quantum advantage if the dynamics $U_x(t, s)$ is hard to simulate classically.

The integrands $$\tilde{J}_x^n(t) \text{ and } \tilde{k}_x^{n,m}(t)$$

can be estimated with a generalized Hadamard (see FIG. 3) test using 1 and 2 control bits respectively. (These circuits can be derived using $$i\,\mathrm{Trace}[O[U, \rho]] = 2\mathrm{Trace}[(Y \otimes O)(c - U)(|+\rangle\langle+| \otimes \rho)(c - U^\dagger)], \quad (19)$$

where c-U is the unitary U controlled by the control qubit.) These circuits require only local control of the $V_n$ unitary (and not controlled time evolution), making particularly suitable for NISQ devices 202. It is assumed in FIG. 2 that the terms $V_n$ are unitary, but if this is not the case $V_n$ can be written as a linear combination of unitary operators the circuits can be executed for each unitary component separately, and the resulting expectation values can be summed to yield the target result.

The circuits in FIG. 2 assume the ability to prepare the initial states $\rho_x$. In the applications described in this disclosure, these can be mixed diagonal states in the computational basis. The measurement operators $O_x$ can similarly be diagonal in the computational basis. The preparation of mixed states requires averaging over many pure state preparations. This may be performed in parallel for multiple $\rho_x$. Consider the case where computational basis state |n) is prepared, then a circuit U is performed and the expectation values of a set of $O_x$ are measured in parallel, yielding a set of estimates of $(n|U^\dagger O_x U|n)$. If this is repeated independently for all computational basis states, and each $\rho_x$ is diagonal in the computational basis, the below equation is obtained $$\mathrm{Trace}\left[U\rho_x U^\dagger O_x\right] = \sum_{m,n} \langle n|\rho_x|m\rangle\langle m|U^\dagger O_x U|n\rangle = \sum_n \langle n|\rho_x|n\rangle\langle n|U^\dagger O_x U|n\rangle. \quad (20)$$

Since the initial distributions $(n|\rho_x|n)$ are known, the estimations of $(n|U^\dagger O_x U|n)$ may be used to compute the target trace. In practice it may not be necessary to prepare all states; it can suffice to sample from a distribution proportional to $(n|\rho_x|n)$. In state-of-the-art quantum experiments this can present a small difficulty, as uploading a new pulse sequence to re-prepare each state may be impractical. One solution to this problem is to initially prepare qubits in the + basis and measure them prior to performing a simulation/computation, which results in a new preparation each time.

Repeating the above procedure at multiple points $s_i$ and $r_i$ allows for parallel estimation of $$\tilde{J}_x^n(t) \text{ and } \tilde{K}_x^{n,m}(t)$$

via Eq. 17 (for fixed n and m). In principle in NISQ devices 202these times can be drawn at random from the range [0, t] and [0, s]. In this case, each choice of starting state and time produces an independent random variable and Hoeding's inequality may be applied. For the estimation of $$\tilde{J}_x^n(t), M$$

repetitions of the experiment yields an estimator $$\overline{\tilde{J}_x^n(t)}$$

that satisfies $$P\left(\left|\tilde{J}_x^n(t) - \overline{\tilde{J}_x^n(t)}\right| > \epsilon\right) \leq 2e^{\frac{-M\epsilon^2}{2\|O_x\|^2 t^2}}, \tag{21}$$

and the number of samples required to estimate this at a constant failure rate scales as $M = \tilde{O}(\epsilon^{-2}\|O_x\|^2 t^2)$ (where $\tilde{O}$ suppresses logarithmic factors in the parameters). Similarly, for the estimation of $$\tilde{K}_x^{n,m}(t),$$

M repetitions of the experiment yields an estimator $$\overline{\tilde{K}_x^{n,m}(t)}$$

that satisfies $$P\left(\left|\tilde{K}_x^{n,m}(t) - \overline{\tilde{K}_x^{n,m}(t)}\right| > \epsilon\right) \leq 2e^{\frac{-M\epsilon^2}{\|O_x\|^2 t^4}}, \tag{22}$$

and the number of samples required to estimate this at a constant failure rate scales as $M = \tilde{O}(\epsilon^{-2}\|O_x\|^2 t^4)$. This implies that $$\tilde{J}_x^n(t) \text{ and } \tilde{K}_x^{n,m}(t)$$

can be estimated to constant relative error with a number of samples that is independent of t.

To make comparison to the following fault-tolerant analysis, it is noted that the no-fast-forward theorem requires a mean circuit depth of O(t) to execute each of the circuits in FIG. 2, so the total gate count to estimate $$\tilde{J}_x^n(t) \text{ and } \tilde{K}_x^{n,m}(t)$$

to constant error $\epsilon$ using these methods scales at best as $\tilde{O}(\epsilon^{-2}\|O_x\|^2 t^3)$ and $=\tilde{O}(\epsilon^{-2}\|O_x\|^2 t^5)$, respectively. By comparison, the total gate count to estimate $S_x(t)$ to constant error $\epsilon$ using the circuit in FIG. 2 scales as $\tilde{O}(\epsilon^{-2}\|O_x\|^2 t)$. These estimates need to be combined to estimate the derivative in Eq. 5. To compute the total cost to estimate this to constant error, it is assumed that $$\tilde{J}_x^n(t) \sim t,\ \tilde{S}_x(t) \sim 1,$$

$\sigma_{x,t} \sim \sigma$ and $\|O_x\| \sim 1$ are independent of x and t, and that it is possible to optimize the number of repetitions of each experiment to minimize the total gate count. It is also assumed that each experiment involves preparation and measurement in commuting basis, and that the covariance between these parallel measurements is 0. Then, the total number of gates required to estimate single derivative terms to error $\epsilon$ scales as $$\tilde{O}\left(\sigma^4 \epsilon^{-2} N_x \left[\sum_{sampled\ t} t^{\frac{3}{2}}\right]^2\right), \tag{23}$$

where $N_x$ is the number of distinct experiments performed. The evaluation of the sum over t depends on whether $S_x(t)$ are sampled logarithmically sparsely or densely. In the former case, the total number of gates scales as $\tilde{O}(\sigma^4 \epsilon^{-2} N_x T^3)$ whilst in the latter it scales as $\tilde{O}(\sigma^4 \epsilon^{-2} N_x T^5)$.

FIG. 3 shows example circuit diagrams 300 for estimating experimental data points and integrands required to calculate first and second order derivatives of the Hamiltonian learning cost function. The circuits include circuits to estimate the signal $S_x(t)$ (top) and the integrands $$\tilde{J}_x^n(t)$$

(middle) and $$\tilde{K}_x^{n,m}(t)$$

(bottom) that are required to calculate the first and second derivatives of the cost function C[H] (Eq. 4). For ease of viewing, labels in the circuits themselves are suppressed (see legend). The circuits assume access to a preparation of ρ and a means to simulate $U_x(t, s)$ (without control) and to implement controlled perturbations $V_n$. The target integrand can be found to be the expectation value of the product of the indicated operators, which (in NISQ) can be read out by repeated preparation and measurement.

FIG. 4 is a flowchart of a first example process 400 for Hamiltonian learning. For convenience, the process 400 will be described as being performed by a classical computing system in data communication with a quantum computer, e.g., a NISQ device. For example, classical processor 102 of FIG. 2, appropriately programmed in accordance with this specification, can perform the process 400.

The system obtains multiple experimental data points, where each experimental data point is generated (i.e., obtained through measurement) according to a Hamiltonian including one or more parameters with unknown values (step 402). Example experimental data points are described above with reference to Eq. 1 and 2. In some implementations the experimental data points can be obtained by performing respective nuclear magnetic resonance (NMR) experiments. In each NMR experiment, a sample of a molecule, crystal, or other material can be placed in a strong magnetic field. For example, the sample (which can initially be at thermal equilibrium) can be perturbed through application of one or more magnetic field pulses (e.g., time-dependent radio frequency pulses that modulate the background magnetic field). The sample is allowed to evolve for a period of time under the magnetic field, which produces a time-dependent response to the magnetic field. This response, or free induction decay, contains information about its generating nuclear spin Hamiltonian (a strongly interacting quantum Hamiltonian due to its strong dipolar coupling), which itself contains information about the molecular or chemical structure of the sample. The response is measured to obtain a corresponding measured signal, e.g., as described above with reference to Eq. 1.

The system iteratively adjusts estimated values of the one or more parameters to minimize a cost function (step 404). The cost function is dependent on the multiple experimental data points and is given by Eq. 4. At each iteration derivatives of the cost function with respect to estimated values of the parameters for the previous iteration are computed using a quantum computer. The derivatives can include first order derivatives or second order derivatives, e.g., as given by Eq. 5 and 6. The system uses the quantum computer to simulate unitary time evolution generated by the Hamiltonian, where the unitary time evolution is interleaved with perturbations including Hermitian operators included in the Hamiltonian. Example operations performed by the quantum computer are described above with reference to FIGS. 2 and 3.

When predetermined completion criteria are met, e.g., the value of the cost function converges, the system outputs values of the parameters that minimize the cost function as learned values (step 406).

Systems, Algorithms and Circuits for Long Term Quantum Computers

Figure 5:
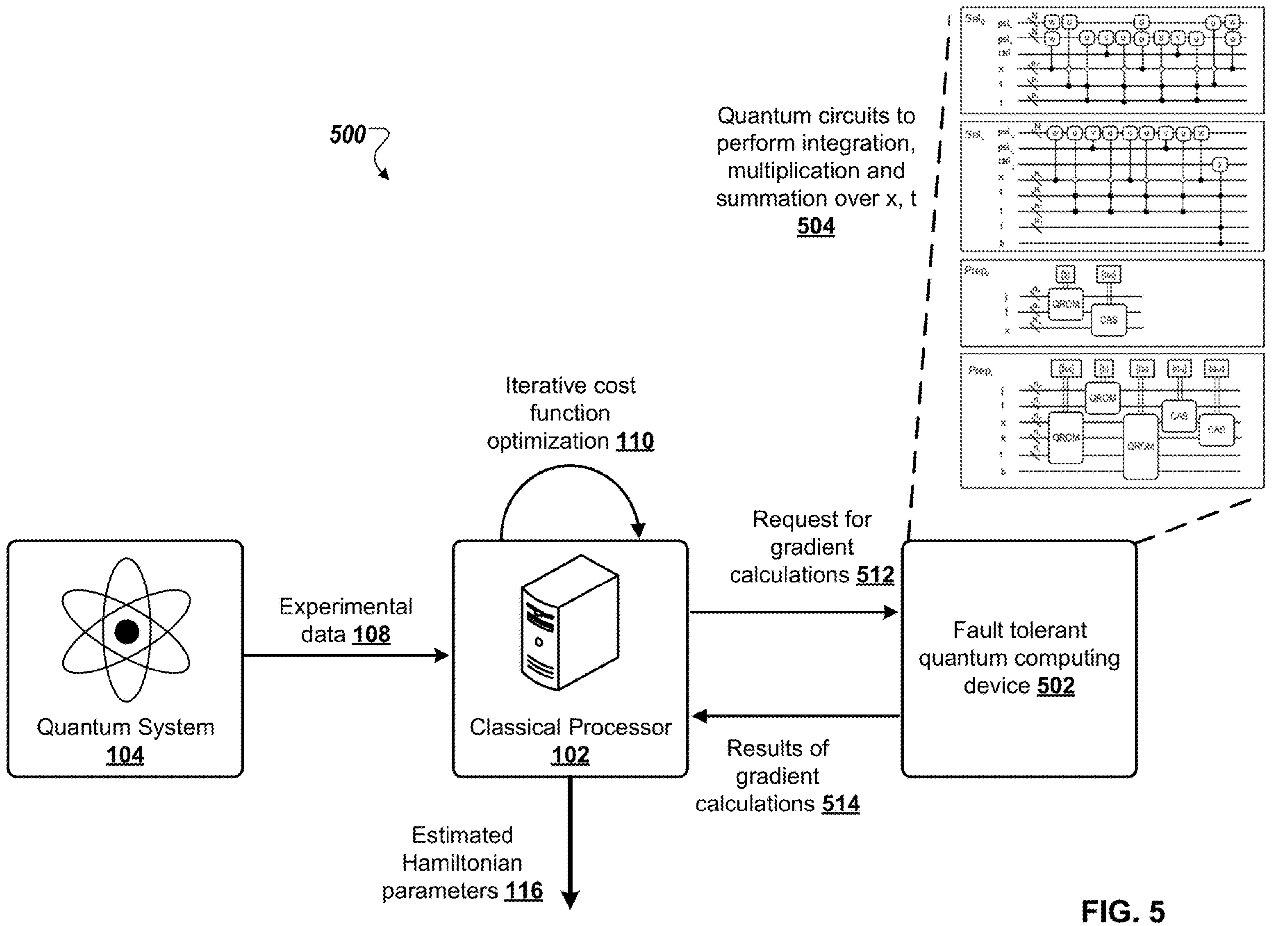
FIG. 5 shows a conceptual block diagram of an example system for Hamiltonian learning using a fault tolerant quantum device.

FIG. 5 shows a conceptual block diagram of an example system 500 for Hamiltonian learning using a fault tolerant quantum device. Example system 500 includes similar components to those included in example system 100 of FIG. 1, except the quantum processor 104 of FIG. 1 is a FT device 502.

In a fault-tolerant cost model, the FT device 502 performs the integration, multiplication and summation over t and x in the second term of Eq. 5 entirely coherently. That is, the classical processor 102 can send data 512 requesting that the FT device 502 perform calculations to directly compute Eq. 5 (or just the second term of Eq. 5). The classical processor 102 can use data representing results 514 of the computations performed by the FT device 502 to perform the iterative cost function optimization.

Assuming that $$\rho_X = W_x|0\rangle\langle 0|W_x^\dagger$$

and using the fact that Trace(A)·Trace(B)=Trace(A⊗B) gives $$\sum_{x,t}\frac{i}{\sigma_{x,t}^2}\tilde{S}_x(t)\tilde{J}_x^n(t) \sim \left\langle 0\otimes 0\otimes + \left|\sum_{x,t,l}\frac{z_{l,t}}{\sigma_{x,t}^2}\mathcal{U}^0(x, t, s_{l,t})\right| 0\otimes 0\otimes +\right\rangle \tag{24}$$

$$\mathcal{U}^0(x, t, s) = W_x^\dagger U_x^\dagger(t, 0)O_x U_x(t, 0)W_x \otimes W_x^\dagger U_x^\dagger(s, 0)[|0\rangle\langle 0| - |1\rangle \langle 1|\bigotimes V_n]U_x^\dagger(t, s)O_x U_x(t, s)[|0\rangle\langle 0|\bigotimes V_n + |1\rangle\langle 1]U(s, 0)W_x, \tag{25}$$

where the approximation is the approximation from the numerical integration. It can be confirmed that $\mathcal{U}^0$(x, t, s) is unitary as long as $V_n$ and $O_x$ are unitaries (and if this is not the case, they may be decomposed as a linear combination of unitaries themselves). The second part of the second term in Eq. 5 requires multiplying by the experimental signal $S_x(t)$. This signal then needs to be loaded onto the device. If performed naively this could easily become the dominant cost in the circuit. To lower this cost, it can be assumed that $S_x(t)$ consists of a small number $N_w \ll T$ of Fourier components $$S_x(t) = \sum_{k=1}^{N_\omega} a_{x,k}\cos(t\omega_{x,k} + \phi_x), \tag{26}$$

where $\phi_x=0$ or $\phi_x=\pi/2$ and $a_{x,k}>0$ is expected from the t=0 behavior of the signal. Then, writing $$\cos(tw_{x,k} + \phi_k) = \frac{1}{2}\left(e^{i(tw_{x,k}+\phi_k)} + e^{-i(tw_{x,k}+\phi_k)}\right)$$

gives $$\sum_{x,t}\frac{i}{\sigma_{x,t}^2}S_x(t)\tilde{J}_x^n(t) \sim \left\langle 0\otimes +_0 \bigotimes +_1\left|\sum_{x,t,l,k}\frac{z_{l,t}a_{x,k}}{\sigma_{x,t}^2}\mathcal{U}^{1(x,t,s_{l,t},k)}\right| 0\otimes +_0\bigotimes +_1\right\rangle \tag{27}$$

$$\mathcal{U}^1(x, t, s, k) = e^{-iZ_1(t\omega_{x,k}+\phi_x)} \times W_x^\dagger U_x^\dagger(s, 0)[|0_0\rangle\langle 0_0| - |1_0\rangle\langle 1_0|\bigotimes V_n] U_x^\dagger(t, s)O_x U_x(t, s)[|0_0\rangle\langle 0_0|\bigotimes V_n + |1_0\rangle\langle 1_0]U_x(s, 0)W_x, \tag{28}$$

where the operations acting on the different control qubits 0 and 1 have been labelled. Under the above assumptions, $\mathcal{U}^1$(x, t, s) is also a unitary. Here, the $s_{l,t}$ and $z_{l,t}$ points are the integration points and weights respectively, but allowing for the fact that the limits of integration (and thus both the points that should be sampled over and the total width needed to multiply by) are dependent on t. Both summations can be then block encoded using LCU techniques. These require control registers |x⟩, |t⟩, |l⟩ and |k⟩ to encode the summation variables (and other additional registers introduced below), and SELECT and PREPARE unitaries. (It is assumed here that the times |t) have some finite binary representation.) These registers contain in turn $n_x$~log $N_x$, $n_t$~log KT, $n_l$~log L qubits, and $n_k$~log $N_w$ qubits, where 1/K is the precision to which the times t are stored.

The $SEL_0$ unitary selects the correct $\mathcal{U}^0$(x, t, $s_{l,t}$) unitary to implement based on the control register. In other words, $SEL_0=\Sigma_{x,t,l}|x\rangle|t\rangle|l\rangle\langle l|\langle t|\langle x|\mathcal{U}^0(x, t, s_{l,t})$. Similarly, $SEL_1=\Sigma_{x,t,l,k}|x\rangle|t\rangle|l\rangle|k\rangle\langle k|\langle l|\langle t|\langle x|\mathcal{U}^1(x, t, s_{l,t}, k)$. In FIG. 6, it is shown how this can be implemented using oracular access to $U_x$(t, s), $O_x$, and $W_x$ (implementations for this will be described below). The $PREP_a$ unitaries prepares the corresponding control states $$\left|\Psi_c^0\right\rangle = \frac{1}{\sqrt{\lambda_0}} \sum\nolimits_{x,t,l} \sqrt{\frac{z_{l,t}}{\sigma_{x,t}^2}} |x\rangle|t\rangle|l\rangle, \tag{29}$$

$$\lambda_0 = \sum_{x,t,l} \left|\frac{z_{l,t}}{\sigma_{x,t}^2}\right|, \tag{30}$$

$$\left|\Psi_c^1\right\rangle = \frac{1}{\sqrt{\lambda_1}} \sum_{x,t,l,k} \sqrt{\frac{z_{l,t} a_{x,k}}{\sigma_{x,t}^2}} |x\rangle|t\rangle|l\rangle|k\rangle, \tag{31}$$

$$\lambda_1 = \sum_{x,t,l,k} \left|\frac{z_{l,t} a_{x,k}}{\sigma_{x,t}^2}\right|, \tag{32}$$

from an initial state |0⟩ on the control register. Garbage registers are omitted in these steps for simplicity. Given these, it can be checked that $$\left\langle 0\middle|PREP_0^\dagger SEL_0 PREP_0\middle|0\right\rangle \sim \frac{1}{\lambda_0} \sum\nolimits_{x,t} \frac{i}{\sigma_{x,t}^2} \tilde{S}_x/(t) \mathcal{J}_x^n(t) \tag{33}$$

$$\left\langle 0\middle|PREP_1^\dagger SEL_1 PREP_1\middle|0\right\rangle \sim \frac{1}{\lambda_1} \sum\nolimits_{x,t} \frac{i}{\sigma_{x,t}^2} S_x(t) \mathcal{J}_x^n(t) \tag{34}$$

where here the circuits act on the combined system and control register set. For a=1,2 an expectation value estimation algorithm can be used to estimate these values to error $\in_a$ with confidence 1-δ using $$O\left(\left|\log\delta^{-1}\right|\epsilon_a^{-1}\right)$$

queries to $PREP_a$, $SEL_a$. Setting $$\epsilon_a = O\left(\frac{\varepsilon}{\lambda_a}\right)$$

gives an estimate of $dC[H]/dh_n$ that is within ∈ with confidence 1-δ. $\Sigma_l z_{l,t}=t$ when sampled at time t, so if it is assumed that $|S_x(t)|\leq 1$ and $\sigma_{x,t}=0$, then $\lambda_1=\lambda_2=N_x/\sigma^2$ ($\Sigma_{sampled\ t}t$). The number of calls required to make to the PREPARE and SELECT oracles then scales as (in comparison to Eq. 23)

$$\tilde{O}\left(\sigma^2 \epsilon^{-1} N_x \sum_{sampled\ t} t\right). \tag{35}$$

To make a heuristic comparison to the NISQ results, an oracular model is considered. The SELECT oracles require time evolution by up to T=max(t), so by the no-fast-forward theorem each oracle call costs at best O(T). Thus, in the sparse sampling case the total complexity is $O(\sigma^2\in^{-1}N_xT^2)$ (a saving of $\in^{-1}T$), while in the dense sampling case the total complexity is $O(\sigma^2\in^{-1}N_xT^3)$ (a saving of $\in^{-1}T^2$). Larger savings are expected for simulating concrete Hamiltonians using fault-tolerant quantum algorithms, as NISQ approaches typically cannot achieve linear scaling in the simulation time.

The complexity of the SELECT unitaries is dictated by the need to implement the controlled time evolution $\Sigma_{x,t,l}|x\rangle|t\rangle|l\rangle\langle l|\langle t|\langle x|U_x(S_{l,t}, 0)$ and $\Sigma_{x,t,l}|x\rangle|t\rangle|l\rangle\langle l|\langle t|\langle x|U_x(t, s_{l,t})$ (the initial preparation $\Sigma_x|x\rangle\langle x|W_x$ is described later). There are a wide range of options for implementing time evolution. Which choice is optimal depends on the details of the Hamiltonian being studied. For example, the SELECT unitaries can be implemented using higher-order product formulas. This choice is near-optimal both for the proposed application of studying spin systems and because it allows for relatively easy implementation of control. It is assumed for practical purposes here that the time evolution is experiment-independent $-U_x(t,s)=U_x(t,s)=e^{iH(t-s)}$. This removes the need to consider the |x) register in the implementation of SELECT. The implementation requires that the discretization of the integral in Eq. 8 is fixed. In some implementations L points $s_{l,t}=tl/L$ can be chosen, with even weights $w_l=t/L$. The error in this approximation can be shown to be bounded by $$\frac{t^2}{L}\|O_x\|\|[H, V_n]\|,$$

which is negligible if $L\gg t^2\|O_x\|\|[H, V_n]\|$. The controlled time evolution part of the SELECT unitary then takes the form $$c-U(s, 0) = \sum_{l=0}^{L}\sum_{t=0}^{T}|l\rangle|t\rangle\langle t|\langle l|e^{\frac{-ilt}{L}H}, \tag{36}$$

$$c-U(t, s) = \sum_{l=0}^{L}\sum_{t=0}^{T}|l\rangle|t\rangle\langle t|\langle l|e^{\frac{-i(L-l)t}{L}H}, \tag{37}$$

This can be implemented by dividing the total time interval [0, t] into R Trotter steps and implementing a higher order product formula in each step. To ensure that the simulation has error at most n, $$R = X_1 T\left(\frac{X_2 T}{\eta}\right)^{o(1)} \tag{38}$$

where the lower case o(1) represents a constant that can be taken to be arbitrarily small, and the $X_1$ and $X_2$ coefficients depend on the system size and graph connectivity. For a linear chain of N qubits, $X_1=X_2=N$. By contrast, assuming a more realistic model of clustered Hamiltonians $$H = \sum_{\mathcal{K}}\sum_{k,k'\in\mathcal{K}} H_{k,k'} + \sum_{\mathcal{K}\neq\mathcal{L}}\sum_{k\in\mathcal{K},l\in\mathcal{L}} H_{k,l}, \tag{39}$$

where $H_{k,l}\ll H_{k,k'}$ whenever k, $k'\in\mathcal{K}\neq\mathcal{L}\ni l$, gives $X_1\sim\Lambda_{ind}$, $X_2\sim\Lambda$, where $$\Lambda_{ind} = \max_{\mathcal{L}}\max_{l\in\mathcal{L}}\sum_{\mathcal{K}}\sum_{k\in\mathcal{K}}\|H_{k,l}\|, \tag{40}$$

$$\Lambda = \sum_{\mathcal{K},\mathcal{L}}\sum_{k\in\mathcal{K},l\in\mathcal{L}}\|H_{k,l}\|. \tag{41}$$

Alternatively, a partial Trotter decomposition can be applied without splitting the terms within each cluster. This reduces the Trotter error to instead scale with $X_2\sim\Lambda_{int}$ where $$\Lambda_{int}=\sum_{\mathcal{K}\neq\mathcal{L}}\sum_{k\in\mathcal{K},l\in\mathcal{L}}\|H_{k,l}\|\ll\Lambda. \tag{42}$$

Each cluster can then be simulated using either product formulas or more advanced quantum algorithms. In some implementations such a hybrid approach can improve the runtime of the approach.

To analyze how the error of quantum simulation affects the accuracy of the overlap estimation, the block diagonal structure of Eqs. 36 and 37 is used. It can be seen that the controlled time evolution has error at most n provided that quantum simulation is performed with accuracy $\eta$. To achieve an accuracy of $\epsilon$ in the estimate of overlap, $\eta_a$ is set to $$\eta_a=O\left(\frac{\epsilon}{\lambda_a}\right)$$

for a=0, 1, respectively. This determines the minimum number of Trotter steps R in Eq. 38.

It is now described how to add the double-control by the $|l\rangle$ and $|t\rangle$ registers to a general product formula $S_p$. (The single-control by the $|t\rangle$ register also required for the $SEL_a$ oracle can be implemented by the following techniques as well.) The near-linear dependence of the time evolution on R and requirement that $L \gg O(t^2)$ implies that $L \gg R$ is required to achieve Hamiltonian simulation with a cost linear in t. This in turn implies that lt/L is not an integer multiple of t/R. For simplicity, it is assumed that L, R are powers of 2, and write $$\frac{lt}{L}=\frac{rt}{R}+q$$

for $0\leq q<t/R$. Writing $q'=qR/T<1$, and then $$\frac{lR}{L}=r+q'$$

gives the number of integer (r) Trotter steps and the fractional remainder q'. Because L and R are powers of two, these integers r and q' are already stored in the first log(R) and the last log(L)-log(R) bits of the l register, and may be identified by renaming l as (r, q'). The integer part (r) determines the number of times for which $S_p(t/R)$ needs to be applied: controlling $$S_p^{2^{b_r}}\left(\frac{t}{R}\right)$$

by the $b_r$-th bit of the $|r)$ control register and the $|t\rangle$ control unitary implements the unitary $$\sum_{r,t}|r\rangle|t\rangle\langle t|\langle r|S_p^r(t/R), \tag{43}$$

where here the $|t\rangle$ register dictates the angle of rotation of each component of the product formula. For example, $\Sigma_t|t\rangle\langle t|e^{it\delta\theta Z_t}$ can be directly implemented bitwise, using the $b_t$th bit of the t register to control a rotation by $e^{i2^{b_t}/2^{n_t}\delta\theta Z_i}$. This has a gate complexity polylogarithmic in the input parameters, and so can be neglected. Similarly, the final fractional Trotter query can be implemented controlled by the $|q'\rangle$ register; i.e., the unitary $$\sum_{q',t}|q'\rangle|t\rangle\langle t|\langle q'|S_p(tq'/R). \tag{44}$$

is implemented. This also has a similar cost that is polylogarithmic in the input parameters. The final scaling of the doubly-controlled time evolution is then identical up to logarithmic factors to the cost of implementing the Trotter evolution without control.

The above implementation of controlled quantum simulation is developed and optimized specifically for product formulas. Another possible circuit implementation that works for not only product formulas but also more advanced quantum simulation algorithms is to use a binary representation of the evolution time and simulate for time 2k with integer k. In any case, the complexity only scales logarithmically with the input parameters and the overhead is negligible. This justifies the comparison between the oracular models in Eq. 35 and Eq. 23, as long as the PREPARE and controlled-$W_x$ circuits have lower costs than SELECT.

A naive implementation of the Trotter steps requires that all the terms in the Hamiltonian are exponentiated. For the clustered model in Eq. 39, this implies a gate complexity of $O(N^2)$ to implement each Trotter step. However, this may be improved by truncating Hamiltonian terms with very small magnitudes or by switching to an advanced quantum simulation algorithm. The rotation gates can also be synthesized with respect to a fault-tolerant gate set, but the overhead in the circuit synthesis is asymptotically negligible.

The PREP0 and PREP1 oracles require loading the coefficients in Eqs. 29 and 31 respectively onto a quantum register. Since a uniform integration measure has been chosen, the integration weights for both PREP0 and PREP1 are independent of the value of the l-register, which may be prepared by applying a Hadamard gate to all qubits. The remainder of the PREPARE oracles can be implemented using QROM and coherent alias sampling (CAS) techniques, which can be used to perform the mappings $|j\rangle|0\rangle\rightarrow|j\rangle|a_j\rangle$ and $$\frac{1}{\sqrt{N_d}}\sum_j|j\rangle\rightarrow\frac{1}{\sqrt{\sum_i a_i}}\sum_j\sqrt{a_j}|j\rangle$$

with $O(N_d)$ Toffoli gates, where $N_d$ is the number of unique data points or indices j. This is important as it is not assumed that the times t are chosen uniformly, so preparing the $|t\rangle$ register is non-trivial. If the times are indexed by some uniform index j, i.e., writing $t=t_j$, QROM can be used to map $|j\rangle|0\rangle\rightarrow|j\rangle|t_j\rangle$ (this requires the $|j\rangle$ register be of with a size $n_d=\log N_d$. CAS techniques can be used to prepare the state $$\frac{1}{\lambda_1}\sum_{j,x}\frac{\sqrt{t}}{\sigma_{x,t_j}}|j\rangle|t_j\rangle|x\rangle,$$

with a cost equal to the number of unique data points. Combining this with the prepared $|l\rangle$ register above yields the PREP0 oracle. If $\sigma_{x,t}=\sigma_t$, i.e., all separate experiments are performed with the same error, which is a reasonable assumption, this has an identical cost of $N_d$. It is assumed that $N_d$ scales at worst linearly in T, i.e., for dense sampling, and so the cost of implementing the PREP0 oracle is bounded by O(T) and dominated in the block encoding by the additive cost of the SEL0 oracle.

The PREP1 oracle differs from the PREP0 oracle by the additional amplitudes $a_{x,k}$. These can be mapped onto the device using CAS at a cost scaling as $N_x N_w$. This cost is additive to the $N_d$ cost, and since it is expected that $N_x N_w \ll N_d$, it is expected that this oracle is also dominated by the cost of SEL1.

As an additional part of the SEL1 subroutine, the controlled Z rotation $$e^{-iZ_2(t\omega_{z,k}+\phi_x)}. \tag{45}$$

needs to be implemented. The classical values $w_{x,k}$ and $\phi_k$ here need to be loaded onto the quantum device, e.g., using QROM techniques. Given the set of $N_w$ classical datapoints $f_{x,k}=2\pi w_{x,k}$ to some fixed precision, QROM can be used to perform the mapping $|k\rangle|x\rangle|0\rangle \rightarrow |k\rangle|x\rangle|f_{x,k}\rangle$ using $O(N_x N_w)$ Toffoli gates. Similarly, $\phi k$ can be mapped onto a single qubit $|x\rangle|0\rangle \rightarrow |x|b_x\rangle$ where $b_x=0$ if $\phi_k=0$ and $b_x=1$ if $\phi_k=\pi/2$, at a cost of $O(N_x)$ Toffoli gates. These mappings can be more appropriate to implement during the PREP1 step. Then, in the SEL1 subroutine, access to these registers can be assumed, in which case the controlled Z rotation can be implemented by arithmetic of the same form as in product formulas at a cost polylogarithmic in the size of the $|f_{x,k}\rangle$ and $|t\rangle$ registers. Alternatively, phase gradient methods can be used, which have a lower fault-tolerant cost.

It remains to describe a preparation scheme for $$\rho_x = W_x|0\rangle\langle 0|W_x^\dagger.$$

This is important to consider as $\rho_x$ is not a pure state, so it is impossible to prepare it from an initial register using the same number of qubits. Instead, the size of the system register is expanded, and a state $|\psi_x\rangle=W_x|0\rangle$ is prepared such that for all observables O within the original system, Trace $[O\rho_x]$=Trace$[O|\psi_x\rangle\langle\psi_x|]$. This requires that the number of qubits of the system N is at most doubled, and in all operations other than $W_x$ and $$W_x^\dagger$$

the additional qubits can be ignored. In some applications of the techniques, e.g., in NMR applications, states of the form $$\rho_x = \frac{1}{2}(I + Z_{j_x}), \tag{46}$$

are often considered, which are maximally mixed states on all qubits except qubit jr. To achieve this with an additional N qubits, N copies of the Bell state $1/\sqrt{2^N}(|00\rangle+|11\rangle^{\otimes N}$ are prepared, which can be performed using only Clifford gates. A Toffoli gate is then performed with x and $j_x$-th qubit as controls and $j_x$+N as target, followed by a Hadamard gate on the $j_x$-th qubit controlled by x. Each controlled Hadamard can be implemented using a single Toffoli gate. This prepares the state $$|x\rangle|\psi_x\rangle = \frac{1}{\sqrt{2^{N-1}}}|0_{j_x}0_{j_x+N}\rangle\prod_{j\neq j_x}\left(|0_j0_{j+N}\rangle + |1_j1_{j+N}\rangle\right), \tag{47}$$

which has the target properties. More generally, any thermal state of the classical 1D Ising model can be prepared as a 2N-qubit thermofield double state with perfect fidelity using a depth N/2 circuit.

FIG. 6 shows example circuit diagrams 600 for fault tolerant oracles used to calculate first and second order derivatives of the Hamiltonian learning cost function. Circuit diagrams of the fault-tolerant oracles SEL0, SEL1, PREP0 and PREP1 described above are shown. Black circles on multi-qubit registers denote complex control procedures. Square boxes denote classical input to the system via QROM. Subscripts are omitted from gates for ease of reading. The dashed circles on the control for U in the SELa circuits indicates control that is only needed if the time evolution during an experiment changes between experiments.

FIG. 7 is a flowchart of a second example process 700 for Hamiltonian learning. For convenience, the process 700 will be described as being performed by a classical computing system in data communication with a quantum computer, e.g., a fault tolerant device. For example, classical processor 102 of FIG. 5, appropriately programmed in accordance with this specification, can perform the process 700.

The system obtains multiple experimental data points, wherein each experimental data point is generated (i.e., obtained through measurement) according to a Hamiltonian including one or more parameters with unknown values (step 702). Example experimental data points are described above with reference to Eq. 1 and 2. In some implementations the experimental data points can be obtained by performing multiple respective nuclear magnetic resonance (NMR) experiments, as described above with reference to step 402 of example process 400.

The system iteratively adjusts estimated values of the one or more parameters to minimize a cost function (step 704). The cost function is dependent on the multiple experimental data points and is given by Eq. 4. At each iteration derivatives of the cost function with respect to estimated values of the parameters for the previous iteration are computed using a quantum computer. The derivatives can include first order derivatives or second order derivatives, e.g., as given by Eq. 5 and 6. The system uses the quantum computer to directly compute the derivatives, e.g., through block encoding. Example operations performed by the quantum computer are described above with reference to FIGS. 5 and 6.

When predetermined completion criteria are met, e.g., the value of the cost function converges, the system outputs values of the parameters that minimize the cost function as learned values (step 706).

Example processes 400 of FIGS. 4 and 700 of FIG. 7 can be applied to learn the structure (e.g., couplings) of a variety of molecules, crystals, or other materials. One example application is Hamiltonian learning of proteins in or on membranes via proton NMR (where dipolar couplings are typically of the order of 30-40 KHz). For example, the example processes 400 and 700 can be applied to learn the structure, e.g., couplings, of ubiquitin. The physical pinning of such systems to the membrane prevents tumbling that would wash away strong correlations in solution. This application is a valuable beyond-classical quantum computing application, e.g., due to the challenges presented by proton NMR such as significant residual coupling, loss of structural information through suppression of dipolar coupling terms, and the differences in behaviour of the folding of proteins in vitro versus vivo.

Additional Implementation Details

Figure 8:
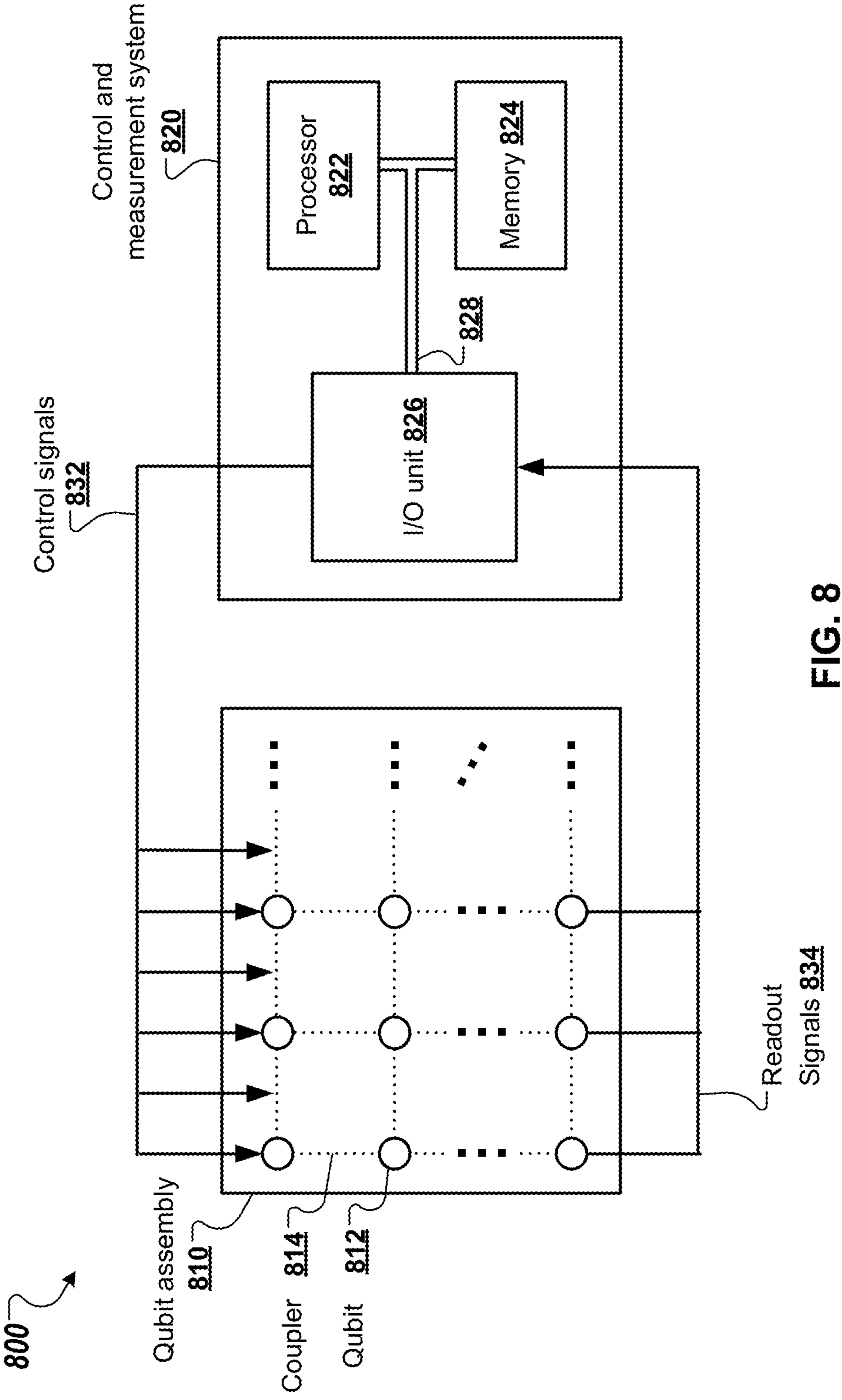
FIG. 8 shows an example quantum computing device that may be used to carry out the quantum computing methods described herein.

FIG. 8 is a block diagram of an example quantum computing device 800. The quantum computing device 800 can be used to perform the quantum computation operations described in this specification according to some implementations. The quantum computing device 800 is intended to represent various forms of quantum computing devices. The components shown here, their connections and relationships, and their functions, are exemplary only, and do not limit implementations of the inventions described and/or claimed in this document.

The quantum computing device 800 includes a qubit assembly 810 and a control and measurement system 820. The qubit assembly 810 includes multiple physical qubits, e.g., qubit 812, that are used to perform algorithmic operations or quantum computations. While the qubits shown in FIG. 8 are arranged in a rectangular array, this is a schematic depiction and is not intended to be limiting. The qubit assembly 810 also includes adjustable coupling elements, e.g., coupler 814, that allow for interactions between coupled qubits. In the schematic depiction of FIG. 8, each qubit is adjustably coupled to each of its four adjacent qubits by means of respective coupling elements. However, this is an example arrangement of qubits and couplers and other arrangements are possible, including arrangements that are non-rectangular, arrangements that allow for coupling between non-adjacent qubits, and arrangements that include adjustable coupling between more than two qubits.

Each qubit can be a two-level quantum system or device having levels representing logical values of 0 and 1. The specific physical realization of the multiple qubits and how they interact with one another is dependent on a variety of factors including the type of the quantum computing device 800 or the type of quantum computations that the quantum computing device 800 is performing. For example, in an atomic quantum computer the qubits may be realized via atomic, molecular or solid-state quantum systems, e.g., hyperfine atomic states. As another example, in a superconducting quantum computer the qubits may be realized via superconducting qubits or semi-conducting qubits, e.g., superconducting transmon states. As another example, in a NMR quantum computer the qubits may be realized via nuclear spin states.

In some implementations a quantum computation can proceed by initializing the qubits in a selected initial state and applying a sequence of quantum logic gates to the qubits. Example quantum logic gates include single-qubit gates, e.g., Pauli-X, Pauli-Y, Pauli-Z (also referred to as X, Y, Z), variations of the Pauli gates, e.g., $\sqrt{X}$, $\sqrt{Z}$, $\sqrt{Y}$ gates, Hadamard and S gates, two-qubit gates, e.g., controlled-X, controlled-Y, controlled-Z (also referred to as CX, CY, CZ), CNOT and gates involving three or more qubits, e.g., Toffoli gates. The quantum logic gates can be implemented by applying control signals 832 generated by the control and measurement system 820 to the qubits and to the couplers.

For example, in some implementations the qubits in the qubit assembly 810 can be frequency tuneable. In these examples, each qubit can have associated operating frequencies that can be adjusted through application of voltage pulses via one or more drive-lines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tuneable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The type of control signals 832 used depends on the physical realizations of the qubits. For example, the control signals may include RF or microwave pulses in an NMR or superconducting quantum computer system, or optical pulses in an atomic quantum computer system.

A quantum computation can be completed by measuring the states of the qubits, e.g., using a quantum observable such as Z, using respective control signals 832. The measurements cause readout signals 834 representing measurement results to be communicated back to the measurement and control system 820. The readout signals 834 may include RF, microwave, or optical signals depending on the physical scheme for the quantum computing device 800 and/or the qubits. For convenience, the control signals 832 and readout signals 834 shown in FIG. 8 are depicted as addressing only selected elements of the qubit assembly (i.e., the top and bottom rows), but during operation the control signals 832 and readout signals 834 can address each element in the qubit assembly 810.

The control and measurement system 820 is an example of a classical computer system that can be used to perform various operations on the qubit assembly 810, as described above. The control and measurement system 820 includes one or more classical processors, e.g., classical processor 822, one or more memories, e.g., memory 824, and one or more I/O units, e.g., I/O unit 826, connected by one or more data buses, e.g., bus 828. The control and measurement system 820 can be programmed to send sequences of control signals 832 to the qubit assembly, e.g., to carry out a selected series of quantum gate operations, and to receive sequences of readout signals 834 from the qubit assembly, e.g., as part of performing measurement operations.

The processor 822 is configured to process instructions for execution within the control and measurement system 820. In some implementations, the processor 822 is a single-threaded processor. In other implementations, the processor 822 is a multi-threaded processor. The processor 822 is capable of processing instructions stored in the memory 824.

The memory 824 stores information within the control and measurement system 820. In some implementations, the memory 824 includes a computer-readable medium, a volatile memory unit, and/or a non-volatile memory unit. In some cases, the memory 824 can include storage devices capable of providing mass storage for the system 820, e.g., a hard disk device, an optical disk device, a storage device that is shared over a network by multiple computing devices (e.g., a cloud storage device), and/or some other large capacity storage device.

The input/output device 826 provides input/output operations for the control and measurement system 820. The input/output device 826 can include D/A converters, A/D converters, and RF/microwave/optical signal generators, transmitters, and receivers, whereby to send control signals 832 to and receive readout signals 834 from the qubit assembly, as appropriate for the physical scheme for the quantum computer. In some implementations, the input/output device 826 can also include one or more network interface devices, e.g., an Ethernet card, a serial communication device, e.g., an RS-232 port, and/or a wireless interface device, e.g., an 802.11 card. In some implementations, the input/output device 826 can include driver devices configured to receive input data and send output data to other external devices, e.g., keyboard, printer and display devices.

Although an example control and measurement system 820 has been depicted in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Figure 9:
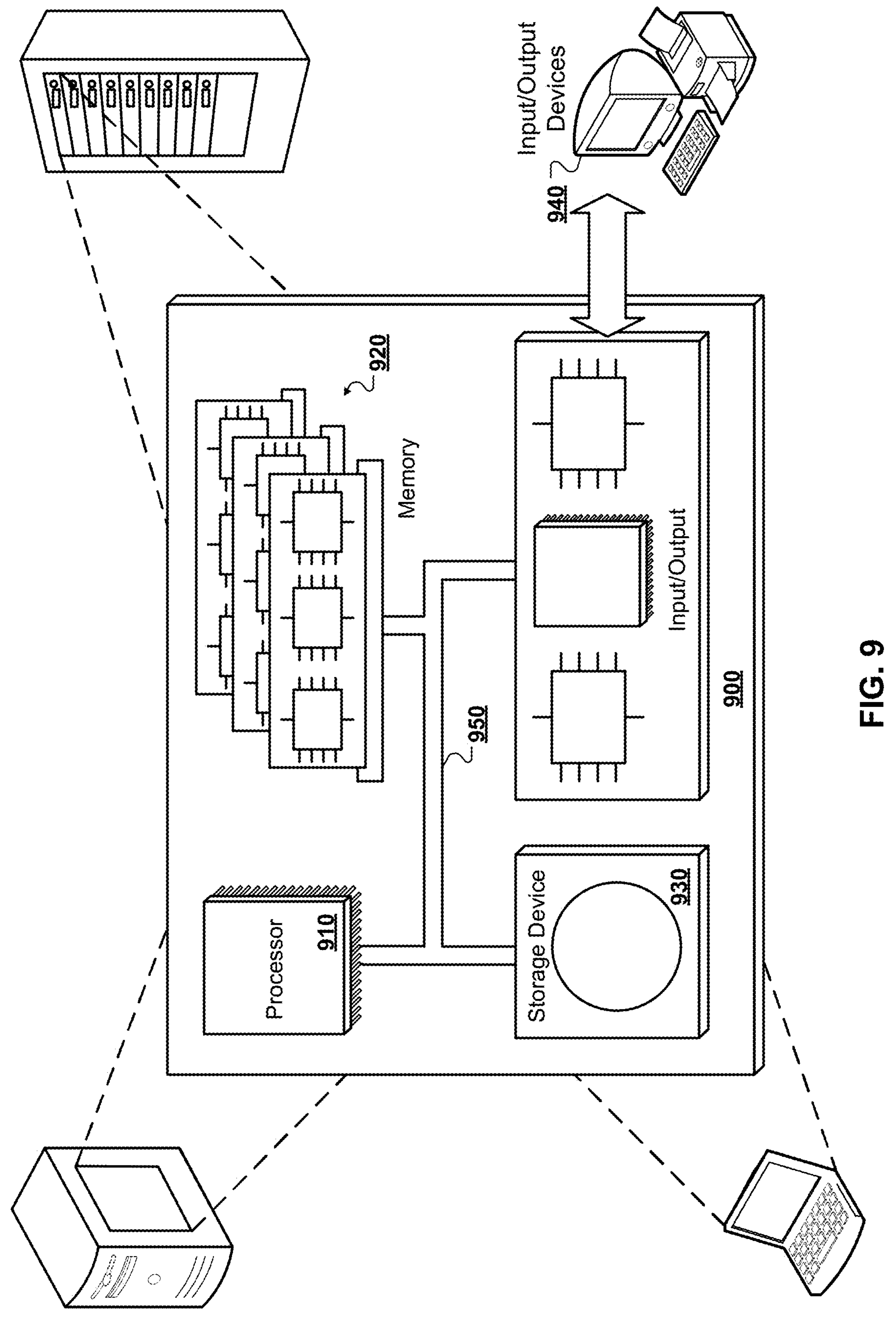
FIG. 9 shows an example classical processor that may be used to carry out the classical computing methods described herein.

FIG. 9 illustrates a schematic diagram of an exemplary generic classical processor system 900. The system 900 can be used for the classical operations described in this specification according to some implementations. The system 900 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 900 includes a processor 910, a memory 920, a storage device 930, and an input/output device 940. Each of the components 910, 920, 930, and 940 are interconnected using a system bus 950. The processor 910 may be enabled for processing instructions for execution within the system 900. In one implementation, the processor 910 is a single-threaded processor. In another implementation, the processor 910 is a multi-threaded processor. The processor 910 may be enabled for processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 may be enabled for providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computing device" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a mark-up language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators.

Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:

obtaining, by a classical processor, multiple experimental data points, wherein each experimental data point is generated according to a Hamiltonian comprising parameters with unknown values; and learning, by the classical processor, values of the parameters, comprising iteratively adjusting, by the classical processor and until predetermined completion criteria are met, estimated values of the parameters to minimize a cost function, wherein the cost function is dependent on the multiple experimental data points and at each iteration derivatives of the cost function with respect to respective estimated values of the parameters for the previous iteration are computed using a quantum computer, and computing derivatives of the cost function with respect to estimated values of the parameters for the previous iteration using the quantum computer comprises using the quantum computer to simulate unitary time evolution generated by the Hamiltonian, wherein the unitary time evolution is interleaved with perturbations comprising Hermitian operators included in the Hamiltonian.

2. The computer-implemented method of claim 1, wherein the experimental data points correspond to respective experiments performed on a quantum system, wherein the experiments comprise beyond-classical experiments.

3. The computer-implemented method of claim 1, wherein the classical processor obtains the experimental data points from a spectrometer through a classical connection.

4. The computer-implemented method of claim 1, wherein the quantum computer comprises a noisy intermediate scale quantum computing device.

5. The computer-implemented of claim 1, wherein the number of experimental data points is greater than or equal to the number of parameters with unknown values.

6. A computer-implemented method comprising:

obtaining, by a classical processor, multiple experimental data points, wherein each experimental data point is generated according to a Hamiltonian comprising parameters with unknown values; and learning, by the classical processor, values of the parameters, comprising iteratively adjusting, by the classical processor and until predetermined completion criteria are met, estimated values of the parameters to minimize a cost function, wherein the cost function is dependent on the multiple experimental data points and at each iteration derivatives of the cost function with respect to respective estimated values of the parameters for the previous iteration are computed using a quantum computer, and the derivatives comprise gradients, wherein each gradient of the cost function comprises multiple integrals, each integral comprising a respective integrand, wherein each integrand comprises an expectation value of i) an observable used to generate the multiple experimental data points given ii) a perturbed state of a quantum system used to generate the multiple experimental data points, wherein the state is perturbed using a Hermitian operator included in the Hamiltonian.

7. The computer-implemented method of claim 6, wherein using a quantum computer to compute derivatives of the cost function with respect to estimated values of the parameters for the previous iteration comprises:

sending, from the classical processor and to the quantum computer, data requesting computation of each integrand of the multiple integrals; and receiving, by the classical processor and from the quantum computer, data representing results of the computation of each integrand of the multiple integrals.

8. The computer-implemented method of claim 7, further comprising:

computing, by the classical processor, the multiple integrals through summation of the data representing results of the computation of each integrand of the multiple integrals;

performing, by the classical processor, multiplication and addition operations using the computed multiple integrals to compute first derivatives of the cost function with respect to estimated values of the parameters for the previous iteration.

9. A computer-implemented method comprising:

obtaining, by a classical processor, multiple experimental data points, wherein each experimental data point is generated according to a Hamiltonian comprising parameters with unknown values; and learning, by the classical processor, values of the parameters, comprising iteratively adjusting, by the classical processor and until predetermined completion criteria are met, estimated values of the parameters to minimize a cost function, wherein the cost function is dependent on the multiple experimental data points and at each iteration derivatives of the cost function with respect to respective estimated values of the parameters for the previous iteration are computed using a quantum computer, wherein the method further comprises:

repeatedly for a predetermined number of repetitions:

preparing, by the quantum computer, a register of qubits in an initial quantum state, the initial quantum state comprising a mixed diagonal state in the computational basis;

applying, by the quantum computer, a quantum circuit to the initial quantum state to obtain an evolved quantum state, the quantum circuit comprising a unitary time evolution operator interleaved with controlled perturbations, wherein the unitary time evolution operator simulates unitary time evolution generated by the Hamiltonian and the controlled perturbations comprise Hermitian operators included in the Hamiltonian, and measuring an observable of the evolved quantum state, the observable comprising the observable used to generate the multiple experimental data points; and computing an expectation value of the measured observables.

10. A computer-implemented method comprising:

obtaining, by a classical processor, multiple experimental data points, wherein each experimental data point is generated according to a Hamiltonian comprising parameters with unknown values; and learning, by the classical processor, values of the parameters, comprising iteratively adjusting, by the classical processor and until predetermined completion criteria are met, estimated values of the parameters to minimize a cost function, wherein the cost function is dependent on the multiple experimental data points and at each iteration derivatives of the cost function with respect to respective estimated values of the parameters for the previous iteration are computed using a quantum computer, and the quantum computer comprises a fault tolerant quantum computing device.

11. A computer-implemented method comprising:

obtaining, by a classical processor, multiple experimental data points, wherein each experimental data point is generated according to a Hamiltonian comprising parameters with unknown values; and learning, by the classical processor, values of the parameters, comprising iteratively adjusting, by the classical processor and until predetermined completion criteria are met, estimated values of the parameters to minimize a cost function, wherein the cost function is dependent on the multiple experimental data points and at each iteration derivatives of the cost function with respect to respective estimated values of the parameters for the previous iteration are computed using a quantum computer, and computing derivatives of the cost function with respect to estimated values of the parameters for the previous iteration using a quantum computer comprises using block encoding to calculate the derivatives of the cost function.

12. The computer-implemented method of claim 11, wherein using a quantum computer to compute derivatives of the cost function with respect to estimated values of the parameters for the previous iteration comprises:

sending, from the classical processor and to the quantum computer, data requesting computation of the derivatives of the cost function; and receiving, by the classical processor and from the quantum computer, data representing results of the computation of the derivatives of the cost function.

13. A computer-implemented method comprising:

obtaining, by a classical processor, multiple experimental data points, wherein each experimental data point is generated according to a Hamiltonian comprising parameters with unknown values; and learning, by the classical processor, values of the parameters, comprising iteratively adjusting, by the classical processor and until predetermined completion criteria are met, estimated values of the parameters to minimize a cost function, wherein the cost function is dependent on the multiple experimental data points and at each iteration derivatives of the cost function with respect to respective estimated values of the parameters for the previous iteration are computed using a quantum computer, wherein the method further comprises:

initializing, by the quantum computer, a control register of qubits in an initial state;

applying, by the quantum computer, a preparation unitary operator to the initial state to obtain a control state of the control register;

applying, by the quantum computer, a select unitary operator to the control state to obtain an evolved state of the control register, wherein the select unitary operator selects a unitary operator to implement based on the control state of the control register; and measuring the evolved state of the control register.

14. A computer-implemented method comprising:

obtaining, by a classical processor, multiple experimental data points, wherein each experimental data point is generated according to a Hamiltonian comprising parameters with unknown values and each experimental data point corresponds to a respective experiment performed on a quantum system, wherein performing the respective experiment comprises:

preparing the quantum system in an initial state;

applying a time evolution operator to the initial state to generate an evolved state, wherein the time evolution operator is generated by the Hamiltonian and an external time-dependent driving field; and measuring an observable of the evolved state; and learning, by the classical processor, values of the parameters, comprising iteratively adjusting, by the classical processor and until predetermined completion criteria are met, estimated values of the parameters to minimize a cost function, wherein the cost function is dependent on the multiple experimental data points and at each iteration derivatives of the cost function with respect to respective estimated values of the parameters for the previous iteration are computed using a quantum computer.

15. A computer-implemented method comprising:

obtaining, by a classical processor, multiple experimental data points, wherein each experimental data point is generated according to a Hamiltonian comprising parameters with unknown values; and learning, by the classical processor, values of the parameters, comprising iteratively adjusting, by the classical processor and until predetermined completion criteria are met, estimated values of the parameters to minimize a cost function, wherein the cost function is dependent on the multiple experimental data points, the cost function comprises a first term and a second term, wherein the first term comprises a sum of squared differences between estimated values of the parameters and a prior of the parameters; and the second term comprises a sum of squared differences between experimental data points estimated using estimated values of the parameters and the obtained experimental data points, and at each iteration derivatives of the cost function with respect to respective estimated values of the parameters for the previous iteration are computed using a quantum computer.

16. A computer-implemented method comprising:

obtaining, by a classical processor, multiple experimental data points, wherein each experimental data point is generated according to a Hamiltonian comprising parameters with unknown values; and learning, by the classical processor, values of the parameters, comprising iteratively adjusting, by the classical processor and until predetermined completion criteria are met, estimated values of the parameters to minimize a cost function, wherein the cost function is dependent on the multiple experimental data points and at each iteration derivatives of the cost function with respect to respective estimated values of the parameters for the previous iteration are computed using a quantum computer, and the derivatives comprise second order derivatives, and wherein each second order derivative of the cost function comprises multiple integrals, each integral comprising an integrand, wherein the integrand comprises:

an expectation value of i) an observable used to generate the multiple experimental data points given ii) a perturbed state of a quantum system used to generate the multiple experimental data points, wherein the state is perturbed using a Hermitian operator included in the Hamiltonian; or an expectation value of i) an observable used to generate the multiple experimental data points given ii) a commutator of a first Hermitian operator included in the Hamiltonian with a perturbed state of a quantum system used to generate the multiple experimental data points, wherein the state is perturbed using a second Hermitian operator included in the Hamiltonian.

17. A computer-implemented method comprising:

obtaining, by a classical processor, multiple experimental data points, wherein each experimental data point is generated according to a Hamiltonian comprising parameters with unknown values; and learning, by the classical processor, values of the parameters, comprising iteratively adjusting, by the classical processor and until predetermined completion criteria are met, estimated values of the parameters to minimize a cost function, wherein the cost function is dependent on the multiple experimental data points and at each iteration derivatives of the cost function with respect to respective estimated values of the parameters for the previous iteration are computed using a quantum computer, and the derivatives comprise second order derivatives, and wherein when a value of the cost function is within a predetermined distance from a global minimum, the second order derivatives of the cost function comprise a sum of products of integrals, each integral comprising an integrand, wherein the integrand comprises an expectation value of i) an observable used to generate the multiple experimental data points given ii) a perturbed state of a quantum system used to generate the multiple experimental data points, wherein the state is perturbed using a Hermitian operator included in the Hamiltonian.

18. A system comprising one or more classical processors in data communication with a quantum computer; wherein the system is configured to perform operations comprising:

obtaining, by a classical processor, multiple experimental data points, wherein each experimental data point is generated according to a Hamiltonian comprising parameters with unknown values; and learning, by the classical processor, values of the parameters, comprising iteratively adjusting, by the classical processor and until predetermined completion criteria are met, estimated values of the parameters to minimize a cost function, wherein the cost function is dependent on the multiple experimental data points and at each iteration derivatives of the cost function with respect to respective estimated values of the parameters for the previous iteration are computed using a quantum computer, and computing derivatives of the cost function with respect to estimated values of the parameters for the previous iteration using the quantum computer comprises using the quantum computer to simulate unitary time evolution generated by the Hamiltonian, wherein the unitary time evolution is interleaved with perturbations comprising Hermitian operators included in the Hamiltonian.

19. A computer program product comprising computer readable instructions that, when executed by a system comprising one or more classical processors in data communication with a quantum computer, causes the system to perform operations comprising:

obtaining, by a classical processor, multiple experimental data points, wherein each experimental data point is generated according to a Hamiltonian comprising parameters with unknown values; and learning, by the classical processor, values of the parameters, comprising iteratively adjusting, by the classical processor and until predetermined completion criteria are met, estimated values of the parameters to minimize a cost function, wherein the cost function is dependent on the multiple experimental data points and at each iteration derivatives of the cost function with respect to respective estimated values of the parameters for the previous iteration are computed using a quantum computer, and computing derivatives of the cost function with respect to estimated values of the parameters for the previous iteration using the quantum computer comprises using the quantum computer to simulate unitary time evolution generated by the Hamiltonian, wherein the unitary time evolution is interleaved with perturbations comprising Hermitian operators included in the Hamiltonian.

* * * * *